US012529615B1

(12) United States Patent
Lakis et al.

(10) Patent No.: US 12,529,615 B1
(45) Date of Patent: Jan. 20, 2026

(54) NON-INVASIVE PIPE PRESSURE MONITORING SYSTEM AND METHOD

(71) Applicant: Triad National Security, LLC, Los Alamos, NM (US)

(72) Inventors: Rollin Evan Lakis, Los Alamos, NM (US); Alessandro Cattaneo, Los Alamos, NM (US); Marcelo Jaime, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 538 days.

(21) Appl. No.: 17/900,507

(22) Filed: Aug. 31, 2022

Related U.S. Application Data

(60) Provisional application No. 63/239,322, filed on Aug. 31, 2021.

(51) Int. Cl.
*G01L 11/02* (2006.01)
*G01K 7/18* (2006.01)

(52) U.S. Cl.
CPC .............. *G01L 11/025* (2013.01); *G01K 7/18* (2013.01)

(58) Field of Classification Search
CPC .................... G01L 11/025; G01K 7/18
See application file for complete search history.

(56) References Cited

U.S. PATENT DOCUMENTS

| 10,989,615 B2* | 4/2021 | Ren | G01F 1/00 |
| 2005/0103123 A1* | 5/2005 | Newman | G01L 1/2218 |
| | | | 73/862.045 |

* cited by examiner

*Primary Examiner* — Manuel A Rivera Vargas
(74) *Attorney, Agent, or Firm* — Womble Bond Dickinson (US) LLP

(57) ABSTRACT

A method of non-invasively determining an internal pressure inside an object, such as a pipe or a tube, includes determining, with a hoop strain sensor on an outer surface of the object, hoop strain of the outer surface of the object; determining, with an axial strain sensor on the outer surface of the object, axial strain of the outer surface of the object; determining, with a manometer, an external pressure external to the object; and determining the internal pressure inside the object based on the hoop strain, the axial strain, the external pressure, an outer dimension of the object, a wall thickness of the object, a modulus of elasticity of the object, and a Poisson ratio of the object.

18 Claims, 14 Drawing Sheets

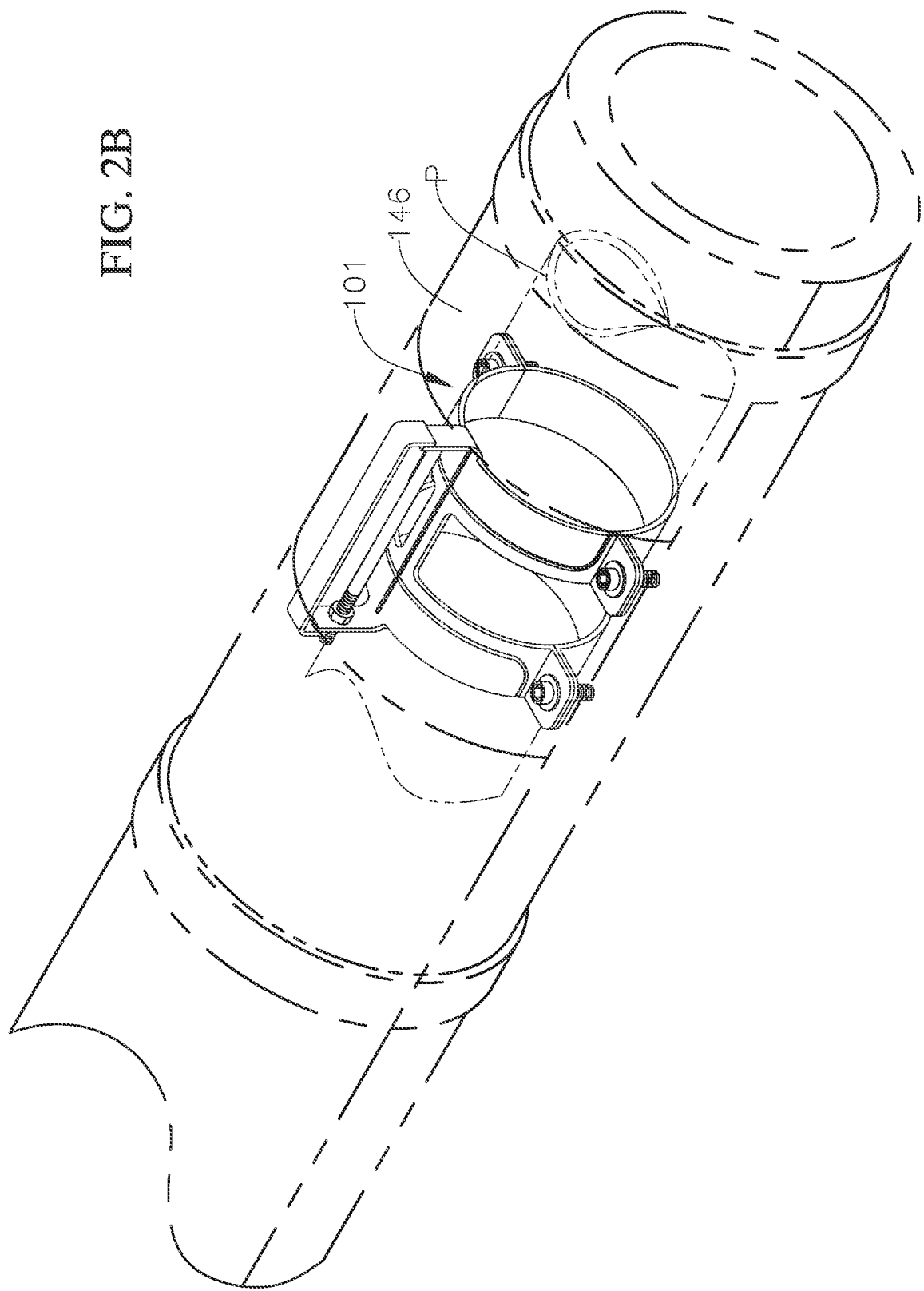

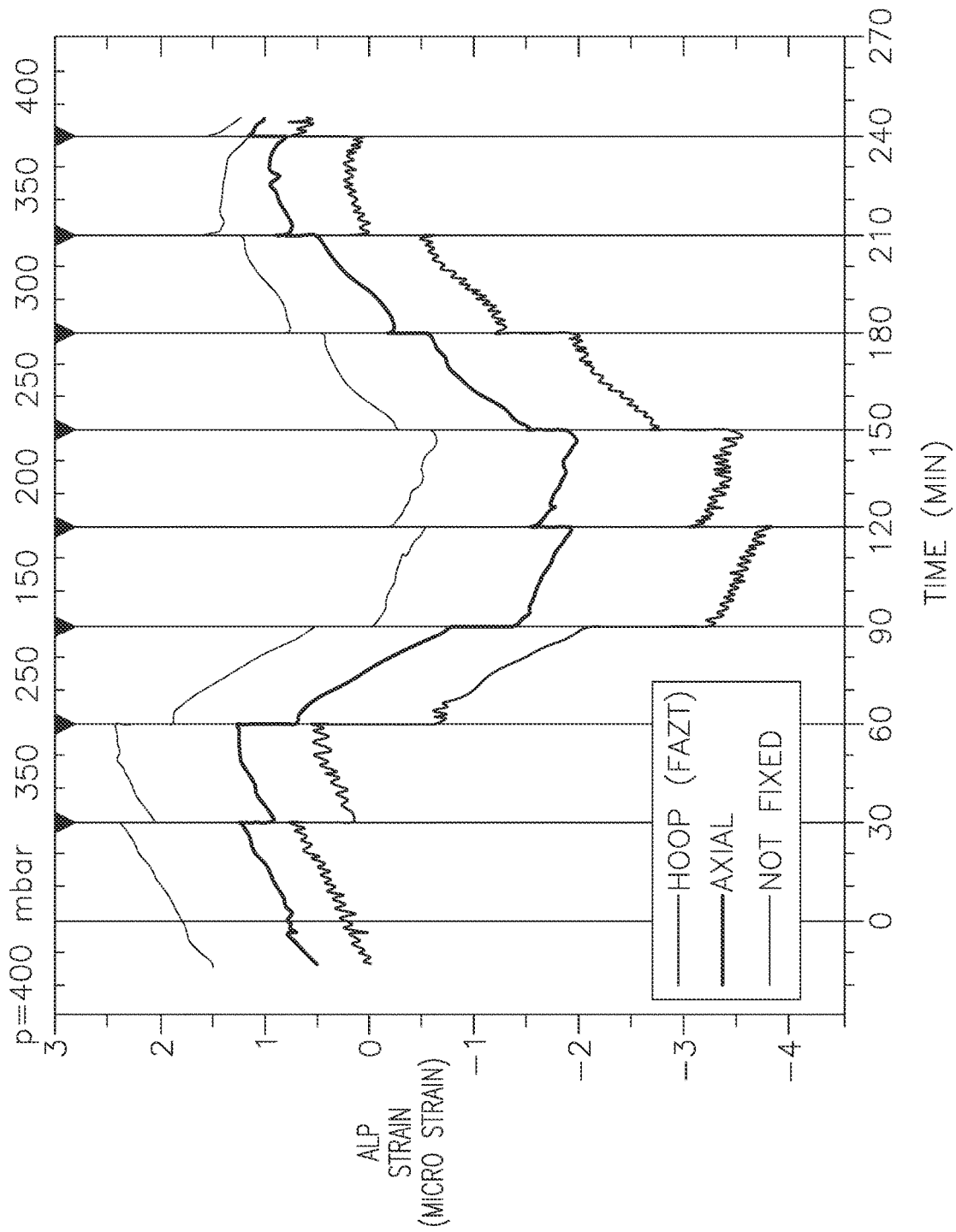

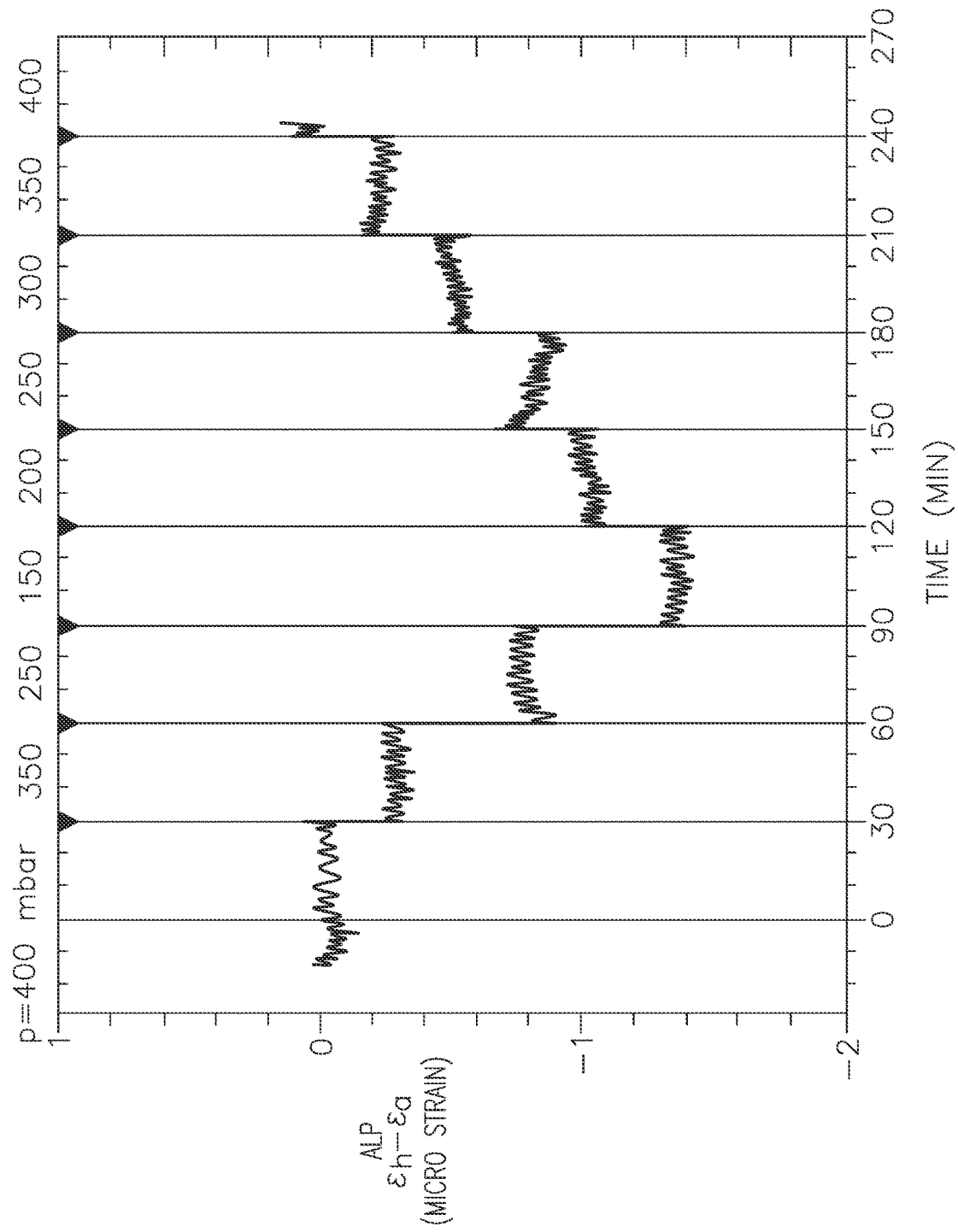

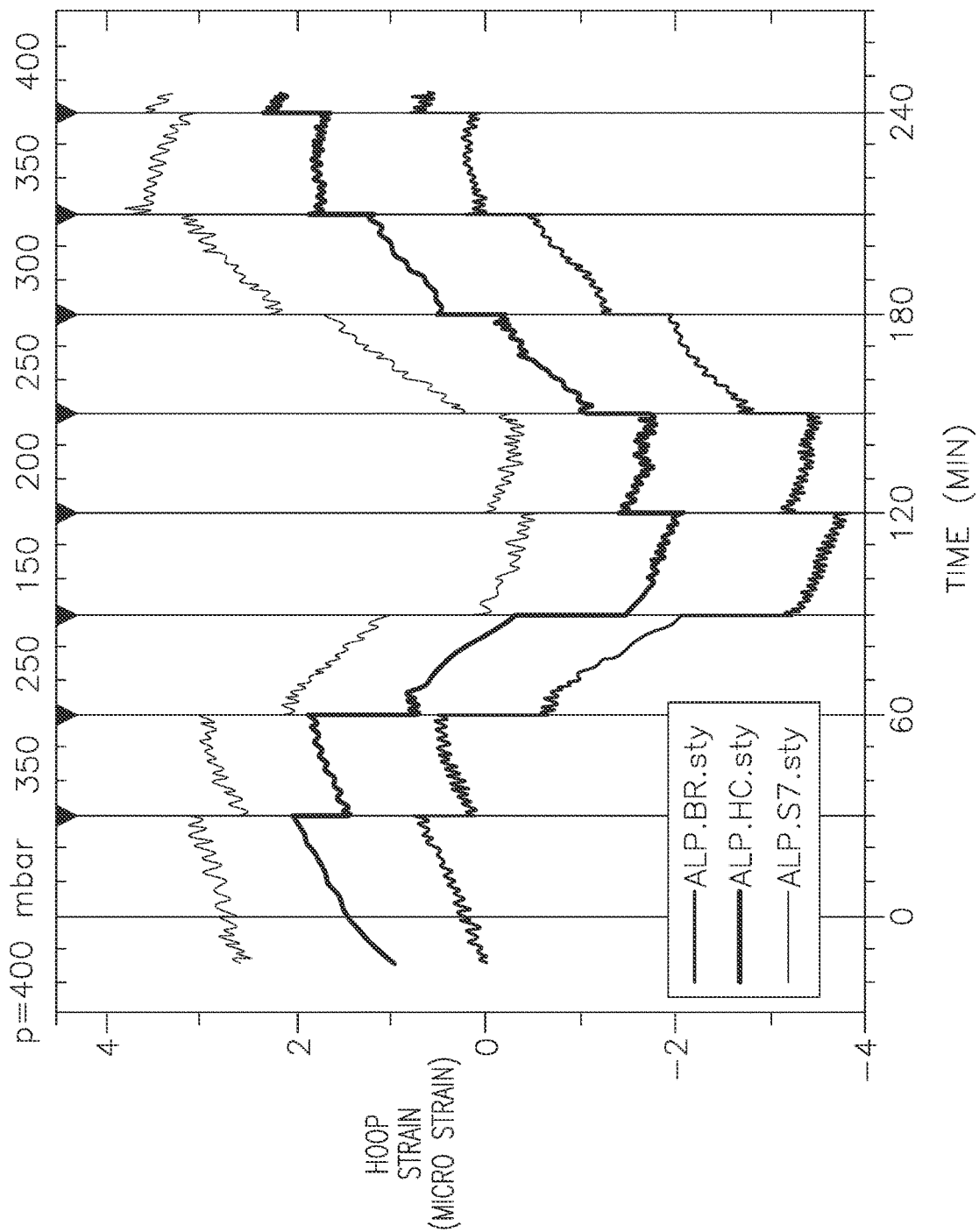

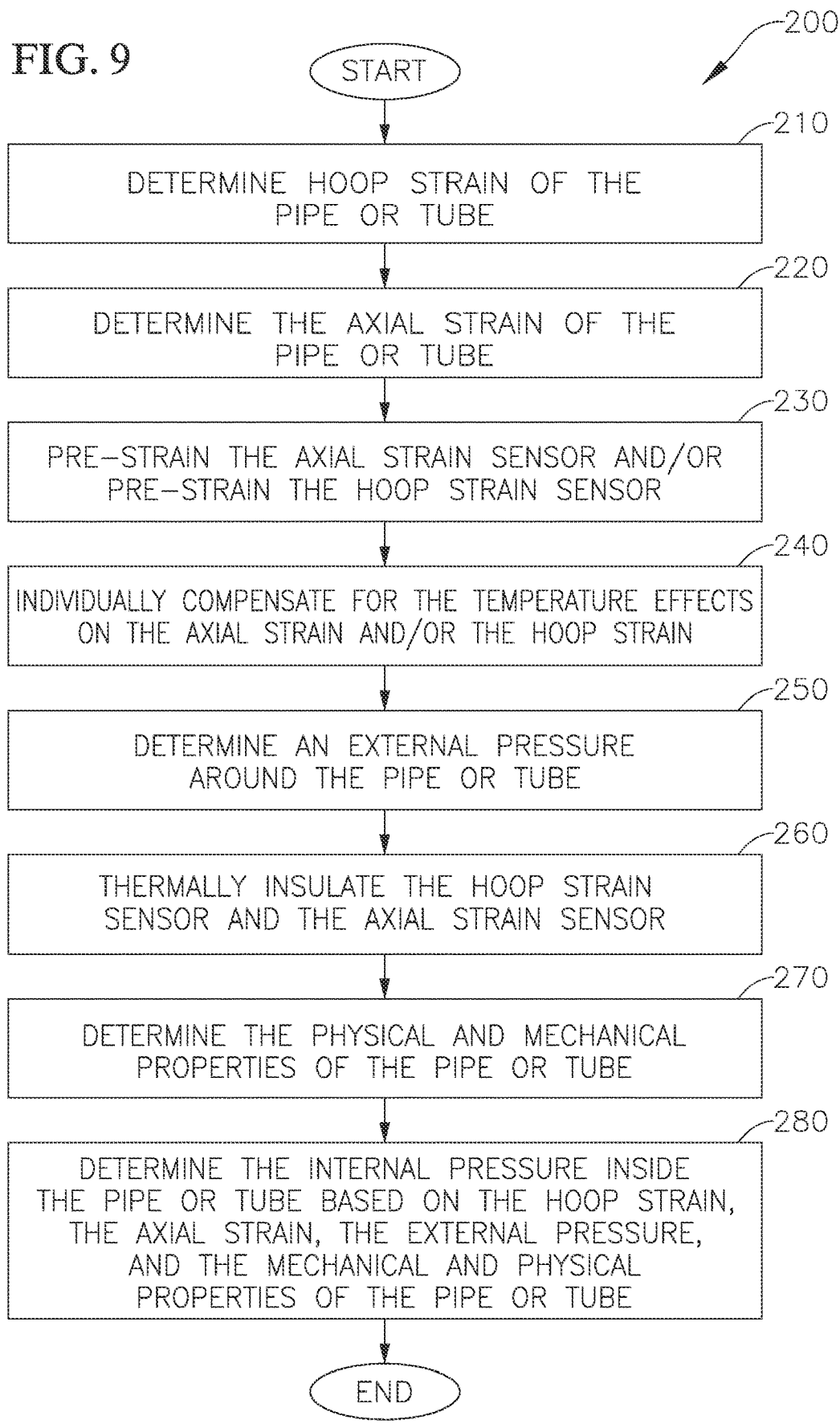

NON-INVASIVE PIPE PRESSURE MONITORING SYSTEM AND METHOD

CROSS-REFERENCE TO RELATED APPLICATION(S)

The present application claims priority to and the benefit of U.S. Provisional Application No. 63/239,322, filed Aug. 31, 2021, the entire contents of which are incorporated herein by reference.

STATEMENT REGARDING GOVERNMENT RIGHTS

The United States government has rights in this invention pursuant to Contract No. 89233218CNA000001 between the United States Department of Energy/National Nuclear Security Administration and Triad National Security, LLC for the operation of Los Alamos National Laboratory.

BACKGROUND

1. Field

The present disclosure relates to systems and methods of non-invasively measuring the internal pressure of a pipe or tube.

2. Description of Related Art

Measuring the pressure inside a pipe or tube is performed in a variety of different industries, such as in water distribution systems, manufacturing facilities, and natural gas and petroleum pipelines. The pressure inside tubes or pipes (or the pressure differential across the wall of the pipe or tube) is typically determined by directly measuring the fluid (e.g., gas or liquid) flowing through the pipe or tube. However, access to the interior of the pipe or tube is not always feasible or practical.

Pipeline monitoring is also performed to implement international safeguards for gas centrifuge enrichment plants (GCEPs). A GCEP, working with uranium in the form of uranium hexafluoride gas ($UF_6$), separates the fissionable isotope uranium-235 ("U-235") from other isotopes in natural uranium, which contains less than 1 percent U-235. Standard enrichment results in a few percent U-235, which constitutes low enriched uranium (LEU). However, with certain illicit modifications to the GCEP, the enrichment of U-235 can exceed the 20 percent threshold for highly enriched uranium (HEU). Currently, the preeminent tool for the enrichment monitoring of $UF_6$ is the on-line enrichment monitor (OLEM). To determine the relative U-235 enrichment, a conventional OLEM combines gamma-ray spectrometry with indirect gas density measurements. However, these indirect gas density measurements rely on temperature and pressure measurements, and the pressure measurement is provided by separate instrumentation controlled by the plant operators, not the OLEM itself. Accordingly, the accuracy of the uranium enrichment determination by the conventional OLEM process is dependent on the accuracy of the pressure data provided by the operator of the GCEP, which may be unreliable, particularly in less compliant jurisdictions.

SUMMARY

The present disclosure relates to various methods of non-invasively determining an internal pressure inside a pipe or a tube. In one embodiment, the method includes determining, with a hoop strain sensor on an outer surface of the pipe or tube, hoop strain of the outer surface of the pipe or tube; determining, with an axial strain sensor on the outer surface of the pipe or tube, axial strain of the outer surface of the pipe or tube; determining, with a manometer, an external pressure external to the pipe or tube; and determining the internal pressure inside the pipe or tube based on the hoop strain, the axial strain, the external pressure, an outer diameter of the pipe or tube, a wall thickness of the pipe or tube, a modulus of elasticity of the pipe or tube, and a Poisson ratio of the pipe or tube.

The method may also include compensating for temperature effects on the hoop strain and the axial strain.

Compensating for the temperature effects may include determining a temperature of the outer surface of the pipe or tube, and adjusting the axial strain and the hoop strain based on the temperature.

Determining the temperature may include determining the temperature utilizing a resistance temperature detector (RTD) device.

Compensating for the temperature effects may include determining, utilizing a reference strain sensor thermally coupled to the pipe or tube with a non-hardening thermal compound, an apparent strain of the pipe or tube caused by temperature changes, and adjusting the axial strain and the hoop strain based on the apparent strain.

The reference strain sensor may be a reference Fiber Bragg Grating (FBG) sensor.

The hoop strain sensor may be a first Fiber Bragg Grating (FBG) strain sensor, and the axial strain sensor may be a second Fiber Bragg Grating strain sensor.

Determining the internal pressure of the pipe or tube may include determining the internal pressure, $p_i$, based on Equation 1:

$$p_i = p_0 - 1.28 \frac{Er^2(r_o^2 - r_i^2)}{(1+\upsilon)r_i^2 r_o^2}\left(\frac{\Delta\lambda_B}{\lambda_B}\bigg|_h - \frac{\Delta\lambda_B}{\lambda_B}\bigg|_a\right),$$

wherein $p_o$ is the external pressure, r is a radius of the pipe or tube where the axial and hoop strain are measured, E is the modulus of elasticity of the pipe or tube, $r_o$ is an outer radius of the pipe or tube, $r_i$ is an inner radius of the pipe or tube, $\upsilon$ is the Poisson's ratio, $(\Delta\lambda_B/\lambda_B|_h)$ is a ratio of a change in a wavelength reflected by a grating in the first FBG strain sensor to an initial wavelength reflected by the grating in the first FBG strain sensor, and $(\Delta\lambda_B/\lambda_B|_a)$ is a ratio of a change in a wavelength reflected by a grating in the second FBG strain sensor to an initial wavelength reflected by the grating in the second FBG strain sensor.

Compensating for the temperature effects may include calculating a thermally compensated strain, $\epsilon_m$, according to Equation 3:

$$\epsilon_m = 1.28\left(\frac{\Delta\lambda_B}{\lambda_B} - R\frac{\Delta\lambda_B^{ref}}{\lambda_B^{ref}}\right),$$

where $\Delta\lambda_B/\lambda_B$ is the ratio of the change in the wavelength reflected by the grating in one of the first and second FBG strain sensors, $\Delta\lambda_B^{ref}/\lambda_B^{ref}$ is the ratio of the change in the wavelength reflected by a grating in the reference FBG sensor, and R is a constant calculated according to Equation 2

$$R = 1 + \frac{\lambda_B^{ref}(\alpha_p - 0.78\alpha_f)}{1.28\gamma_f},$$

where $\lambda_B^{ref}$ is the wavelength of the reference FBG sensor, $\alpha_p$ is an average coefficient of thermal expansion of the pipe or tube, $\alpha_f$ is an optical fiber coefficient of thermal expansion for the one of the first and second FBG strain sensors, and $\gamma_f$ is a fiber thermal response of the one of the first and second FBG strain sensors.

The method may also include thermally insulating the hoop strain sensor and the axial strain sensor with insulation. The insulation may be polyiso pipe insulation.

The method may also include determining, with an ultrasound device, the wall thickness of the pipe or tube.

The method may further include determining, with an ultrasound device, the modulus of elasticity and the Poisson ratio of the pipe or tube.

The method may also include determining, with an x-ray fluorescence device, a material of the pipe or tube.

The method may also include measuring, with a caliper, the outer diameter of the pipe or tube.

The method may also include pre-straining the axial strain sensor and/or the hoop strain sensor.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable system or method of non-invasively measuring internal pipe or tube pressure.

BRIEF DESCRIPTION OF THE DRAWINGS

The features and advantages of embodiments of the present disclosure will become more apparent by reference to the following detailed description when considered in conjunction with the following drawings.

FIG. 2B depicts thermal insulation surrounding the clamp, the axial strain sensor, the hoop strain sensor, and the reference sensor depicted in FIG. 2A.

FIG. 7a is a graph depicting hoop strain, axial strain, and apparent strain in the reference sensor on the outer surface of an aluminum pipe. Hoop and axial strains are measured by FBG strain sensors attached directly to the aluminum pipe with Stycast® 2850 epoxy, and apparent strain is measured by a reference FBG strain sensor held in place by a thermal compound;

FIG. 7b depicts that the experimental difference between hoop strain and axial strain shown in FIG. 7a for 50 mb pressure step changes from 400 mb down to 150 mb and back up to 400 mb;

FIG. 8a is a graph depicting hoop strain of an outer surface of an aluminum pipe measured by an FBG strain sensor mounted to the pipe in three different ways, (i) the FBG strain sensor is secured directly to the outer surface of the aluminum pipe with Stycast® 2850 epoxy ("ALP.BR.sty"); (ii) the FBG strain sensor is secured to the aluminum pipe with the embodiment of the H-clamp illustrated in the lower portion of FIG. 1 ("ALP.HC.sty"); and (iii) the FBG strain sensor is secured to the aluminum pipe with a band clamp having a thickness of 0.007 inch ("ALP.S7.sty");

FIG. 9 is a flowchart illustrating tasks of a method of non-invasively determining the internal pressure inside a pipe or a tube according to one embodiment of the present disclosure.

DETAILED DESCRIPTION

The present disclosure relates to various embodiments of systems and methods for non-invasively measuring the internal pressure of a fluid (e.g., a liquid or a gas) flowing through a pipe or a tube. The systems and methods of the present disclosure enable measurement of the internal pressure without access to the fluid flowing through the pipe or tube. The systems and methods of the present disclosure utilize a measurement or determination of hoop strain and axial strain at an outer surface of the pipe or tube, and then the axial strain is subtracted from the hoop strain to separate or distinguish the temperature effects on the pipe or tube from the internal pressure effects on the pipe or tube. In this manner, the systems and methods of the present disclosure do not require any modification to the pipe or tube to determine the internal pressure of the pipe or tube. In one or more embodiments, the systems and methods of the present disclosure are configured to achieve a temperature-compensated differential pressure resolution of a few millibar (mBar, or mb), depending on the wall thickness, the material, and the diameter of the pipe or tube. In addition, a reference sensor can be utilized to measure the apparent strain caused by temperature changes. The reference sensor can be used to individually compensate the hoop strain and axial strain sensors for temperature effects.

In one or more embodiments, the systems and methods of the present disclosure may be utilized to increase the confidence in uranium enrichment measurements of gas centrifuge enrichment plants (GCEPs) collected by an on-line enrichment monitor (OLEM). For instance, the systems and methods of the present disclosure may be utilized to independently and non-invasively determine the pressure inside GCEP pipes, which may replace the need for pressure measurements provided by separate instrumentation controlled by the GCEP operator. That is, the systems and methods of the present disclosure are configured to increase the confidence in uranium enrichment measurements by an OLEM by eliminating or at least reducing the reliance on data provided by the GCEP operator, which may be unreliable, particularly in less compliant jurisdictions.

Figure 1:
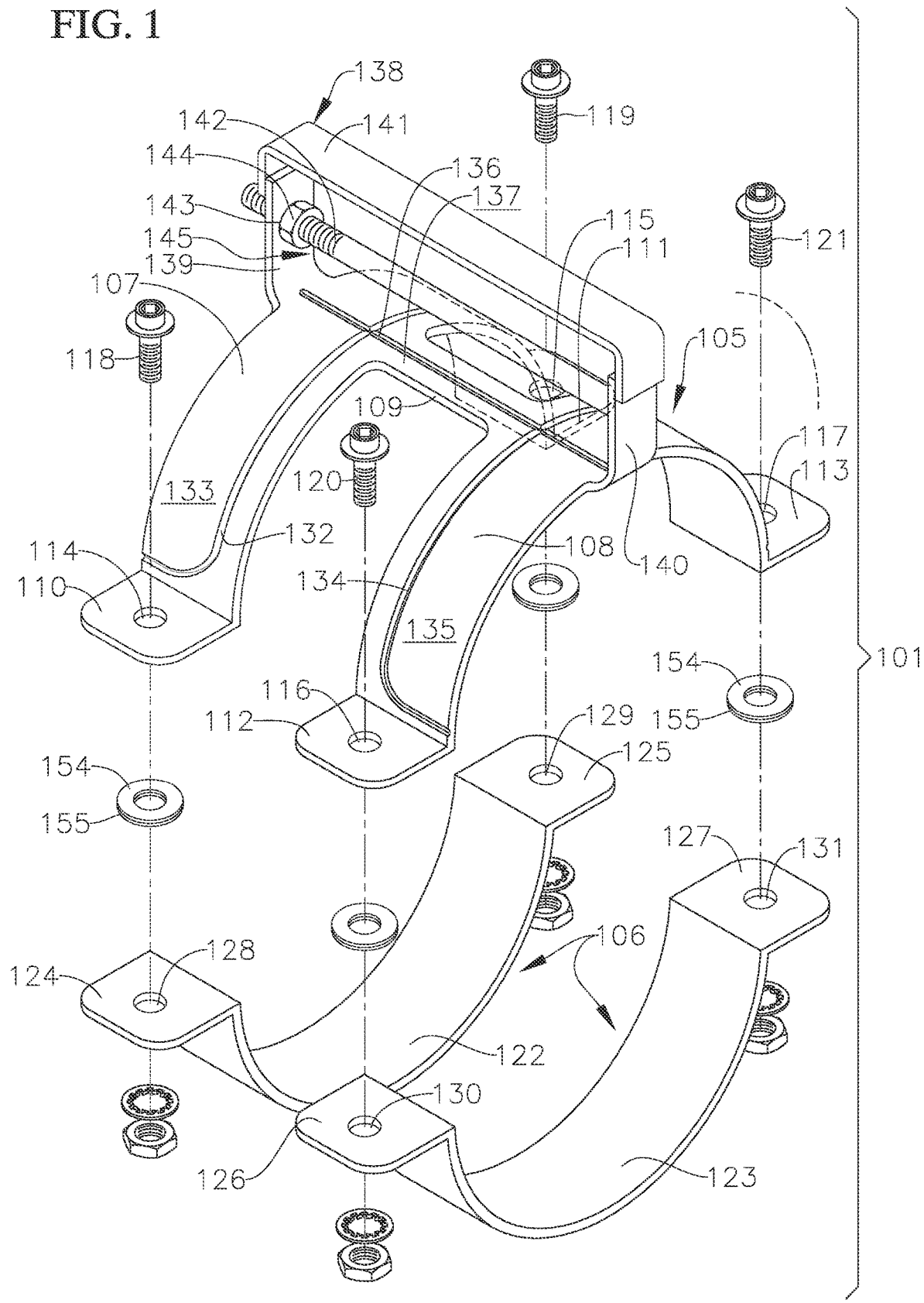
FIG. 1 is an exploded perspective view of a clamp for securing an axial strain sensor, a hoop strain sensor, and a reference sensor to an outer surface of a pipe or tube according to one embodiment of the present disclosure.
Figure 2A:
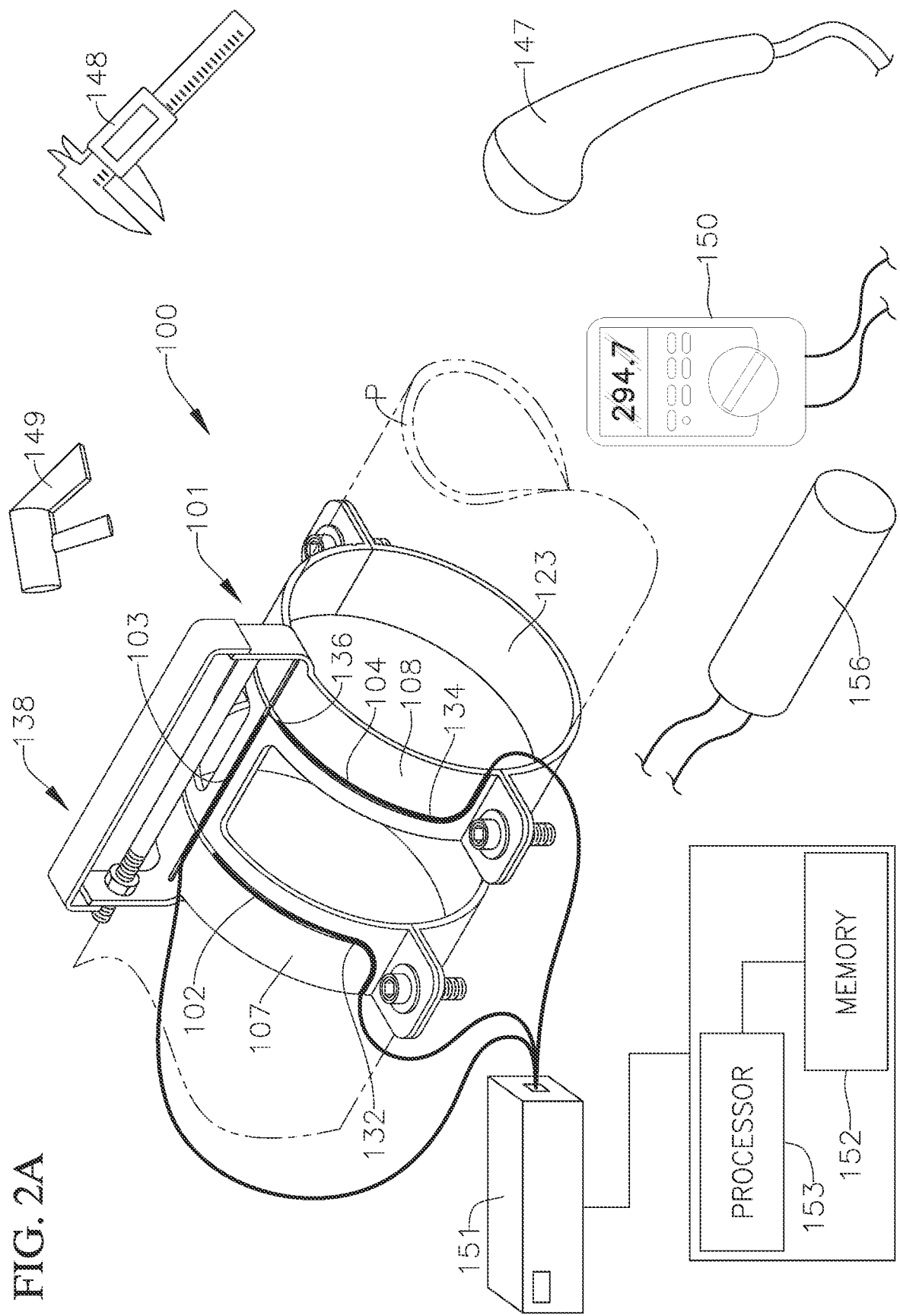
FIG. 2A depicts the embodiment of the clamp shown in FIG. 1, and the axial strain sensor, the hoop strain sensor, and the reference sensor thereon, secured to a pipe or tube according to one embodiment of the present disclosure.

With reference now to FIGS. 1-2B, a system 100 for non-invasively measuring the pressure inside a pipe or tube includes a clamp 101 configured to surround a portion of the pipe or tube P, a hoop strain sensor 102 on the clamp 101 that is configured to measure or determine hoop strain of the outer surface of the pipe or tube P, and an axial strain sensor 103 on the clamp 101 that is configured to measure or determine axial strain of the outer surface of the pipe or tube P. Additionally, in one or more embodiments, the system 100 may include a reference sensor 104 to measure the apparent strain caused by temperature changes. The reference sensor 104 can be used to individually compensate the hoop strain and axial strain sensors 102, 103 for temperature effects.

In the illustrated embodiment, the hoop strain sensor 102, the axial strain sensor 103, and the reference sensor 104 are all Fiber Bragg Gratings (FBG) strain sensors. The FBG sensors include a grating inside an optical fiber (e.g., a 125 µm diameter optical fiber). The grating is tuned (i.e., the pitch of the grating is selected) to reflect a particular wavelength of infrared light. Strain on the FBG sensor changes the spacing (i.e., the pitch) of the grating, which correspondingly changes the wavelength of light reflected by the grating (i.e., the shift in the wavelength of light reflected by the grating corresponds to the change in strain). In this manner, the shift in the wavelength of light reflected by the FBG sensor may be utilized to measure or determine the strain imparted on the sensor due to the strain of the pipe or tube P due to the pressure differential across the wall of the pipe or tube P (i.e., the pressure differential inside and outside the pipe or tube) or to measure changes in the pipe temperature (i.e., temperature effects on a sensor that is in thermal contact with the pipe but not glued to the pipe). In one or more embodiments, the FBG strain sensors are configured to measure strain with precision on the order of ten parts in a billion (i.e., $\Delta L/L \sim 10^{-8}$) or better precision. In one or more embodiments, the FBG strain sensors may include a polyimide coated or recoated single mode fiber furbished with an FBG array having a length in a range from approximately 5 mm to approximately 15 mm and which have a full width at half maximum (FWHM) in a range from approximately 0.25 nm to approximately 0.50 nm. In one or more embodiments, the FBG sensors have Bragg wavelengths in the range of approximately 1500 nm to approximately 1600 nm and a reflectivity in the range of 30% to 70%. In one or more embodiments, the FBG strain sensors may be FBG stain sensors sold by Micron Optics and/or Technica SA. In one or more embodiments, any other suitable type or kind of strain sensor may be utilized depending on the required precision. For instance, in one or more embodiments, less accurate strain sensors may be utilized when the pipe or tube P has a thin wall and/or when the material of the pipe or tube P is such that the pipe or tube P has a relatively small modulus of elasticity. In one or more embodiments, the strain sensors 102, 103, 104 may be a Wheatstone bridge including a resistive foil strain gauge, a piezo-resistor strain gauge, an optical strain sensor (e.g., utilizing electron speckle pattern interferometry or digital image correlation), or a capacitive strain gauge.

In the illustrated embodiment, the clamp 101 includes a first clamp half 105 and a second clamp half 106 configured to be secured together around the pipe or tube P. Additionally, in the illustrated embodiment, the first clamp half 105 is an H-clamp half including a first semi-circumferential leg or band 107, a second semi-circumferential leg or band 108 spaced axially apart from the first semi-circumferential leg or band 107, and a bridge 109 extending axially from the first semi-circumferential band 107 to the second semi-circumferential band 108. Additionally, in the illustrated embodiment, the H-clamp half further includes a first pair of flanges 110, 111 at opposite ends of the first semi-circumferential band 107, and a second pair of flanges 112, 113 at opposite ends of the second semi-circumferential band 108. Each of the flanges 110, 111, 112, 113 includes an opening 114, 115, 116, 117 (e.g., a hole) configured to accommodate a fastener 118, 119, 120, 121, respectively, securing the first clamp half 105 to the second clamp half 106.

In the illustrated embodiment, the second clamp half 106 includes a first semi-circumferential leg or band 122, and a second semi-circumferential leg or band 123 spaced axially apart from the first semi-circumferential leg or band 122. Additionally, in the illustrated embodiment, the second clamp half 106 further includes a first pair of flanges 124, 125 at opposite ends of the first semi-circumferential band 122, and a second pair of flanges 126, 127 at opposite ends of the second semi-circumferential band 123. Each of the flanges 124, 125, 126, 127 includes an opening 128, 129, 130, 131 (e.g., a hole) configured to align with the openings 114, 115, 116, 117 in the flanges 110, 111, 112, 113 of the first clamp half 105 and to accommodate one of the fasteners 118, 119, 120, 121 securing the first clamp half 105 to the second clamp half 106. When the first and second clamp halves 105, 106 are secured together around the pipe or tube P, the fasteners 118, 119, 120, 121 extend through the corresponding openings 114-117 and 128-131 in the flanges 110-113 and 124-127, and together the first semi-circumferential bands 107, 122 and the second semi-circumferential bands 108, 123 of the first and second clamp halves 105, 106 form a first circumferential band and a second circumferential band extending completely around the pipe or tube P. Moreover, in the illustrated embodiment, inner diameters of the first and second circumferential bands are equal or substantially equal to an outer diameter of the pipe or tube P.

In one or more embodiments, the first and second clamp halves 105, 106 may each have a thickness in a range from approximately 0.02 inch to approximately 0.08 inch. Additionally, in the illustrated embodiment, the first clamp half 105 includes a first semi-circumferential groove 132 in an outer surface 133 of the first semi-circumferential band 107, a second semi-circumferential groove 134 in an outer surface 135 of the second semi-circumferential band 108, and an axial groove 136 in an outer surface 137 of the bridge 109. The axial strain sensor 103 is at least partially accommodated (e.g., recessed) in the axial groove 136, and the hoop strain sensor 102 is at least partially accommodated (e.g., recessed) in at least one of the first and second semi-circumferential grooves 132, 134. The reference sensor 104 is partially accommodated in either the axial or semi-circumferential grooves 132, 134, 136. In one or more embodiments, the axial strain sensor 103 and the hoop strain sensor 102 may be secured in the axial groove 136 and one of the first and second semi-circumferential grooves 132, 134, respectively, with an adhesive (e.g., epoxy) such as Pattex® Ultragel cyanoacrylate (superglue) or blue Stycast® 2850 adhesive. In one or more embodiments, the reference sensor 104 is thermally anchored or secured in the axial or semi-circumferential groove 136, 132, or 134 with a non-hardening thermal compound such that the reference sensor 104 senses temperature changes but not strain on the pipe or tube P.

In the illustrated embodiment, the first clamp half 105 also includes a tensioning mechanism 138 configured to axially tension the axial strain sensor 103. Tensioning the axial strain sensor 103 is configured to ensure that the axial strain sensor 103 will remain taught when the clamp 101 and the pipe or tube P axially contract in response to the internal pressure inside the pipe or tube P decreasing. In the illustrated embodiment, the tensioning mechanism 138 is located above the bridge 109 and the axial strain sensor 103 on the bridge 109. In the illustrated embodiment, the tensioning mechanism 138 includes a first flange 139 extending outward from a leading edge of the first semi-circumferential band 107 of the first band half 105, a second flange 140 extending outward from a trailing edge of the second semi-circumferential band 108, a clip 141 connecting an outer end of the first flange 139 to an outer end of the second flange 140, a stud 142 coupled to the second flange 140 and extending through an opening 143 (e.g., a hole) in the first flange 139, and a nut 144 on threads 145 of the stud 142 between the first and second flanges 139, 140. To increase the axial tension on the axial strain sensor 103, the nut 144 may be threaded on the threads 145 of the stud 142 toward the first flange 139, which presses the first and second flanges 139, 140 apart from each other and thereby axially elongates the bridge 109 and the axial strain sensor 103 (i.e., threading the nut 144 pre-strains the axial strain sensor 103).

Additionally, in the illustrated embodiments, the fasteners 118, 119, 120, 121 securing the first clamp half 105 to the second clamp half 106 may be tightened to adjust the tension on the hoop strain sensor 102 (i.e., the fasteners 118, 119, 120, 121 may be tightened to pre-strain the hoop strain sensor 102). Accordingly, securing the hoop and axial strain sensors 102, 103 (e.g., the hoop and axial FBG strain sensors) to the pipe or tube P via the clamp 101 enables these strain sensors 102, 103 to be pre-strained. Additionally, securing the strain sensors 102, 103, 104 (e.g., the FBG strain sensors) to the pipe or tube P via the clamp 101 also enables sensor exchangeability (e.g., because the strain sensors 102, 103, 104 are not directly secured to the pipe or tube P, the strain sensors 102, 103, 104 may be replaced by replacing the clamp 101).

Additionally, in the illustrated embodiment, the system 100 includes thermal insulation 146 (see FIG. 2B) covering the clamp 101 and the hoop, axial, and reference strain sensors 102, 103, 104 thereon. The thermal insulation 146 may be any suitably thermal insulating material, such as polyiso pipe insulation with Saran 560 sold by Amerisafe™. Additionally, in one or more embodiments, the thermal insulation 146 may have any suitable thickness, depending for instance on the material of the thermal insulation, suitable to substantially thermally isolate the hoop strain sensor 102, the axial strain sensor 103, and the reference sensor 104 from variations in temperature outside of the pipe or tube P. In one or more embodiments, the thermal insulation 146 may have a thickness in a range from approximately 0.5 inch to approximately 1.5 inches (e.g., approximately 1 inch). The thermal insulation 146 is configured to isolate the hoop strain sensor 102, the axial strain sensor 103, and the reference strain sensor 104 from variations in the temperature of the environment outside of the pipe or tube P, which might otherwise affect the accuracy of the measurements by the hoop strain sensor 102 and the axial strain sensor 103 and thereby affect the measurement of the internal pressure inside the tube or pipe P.

In one or more embodiments, the system 100 may include one or more instruments for measuring or determining the physical dimensions and mechanical properties of the pipe or tube P, including the outer diameter of the pipe or tube P, the wall thickness of the pipe or tube P, and the material of the pipe or tube P (or the modulus of elasticity and the Poisson's ratio of the pipe or tube, or density for additional modeling of the pipe's behavior). For example, in one or more embodiments, the system 100 may include a portable ultrasound device 147 to measure or determine the modulus of elasticity, the Poisson ratio, and the wall thickness of the pipe or tube P. In one or more embodiments, the system 100 may include a caliper 148 to measure the outer diameter of the pipe or tube P. Additionally, in one or more embodiments, the system 100 may include an x-ray fluorescence device 149 configured to determine the material of the pipe or tube P. In one or more embodiment, the physical dimensions and mechanical properties of the pipe or tube P may be known a priori (e.g., by referencing a manufacturer's stamp or label on the pipe or tube P) and therefore in one or more embodiments the system 100 may not include instruments for measuring or determining the physical and mechanical properties of the pipe or tube P. Additionally, in the illustrated embodiment, the system 100 includes a device 150 (e.g., a manometer) to measure the external pressure (i.e., the pressure external to the pipe or tube).

In one or more embodiments in which the hoop, axial, and reference strain sensors 102, 103, 104 are FBG strain sensors, the system 100 also includes an optical sensing instrument 151 (e.g., a Micron Optics Hyperion® si155 interrogator or a FAZ Technology FAZT I4® interrogator) configured to generate a laser beam (e.g., a swept laser running at 5 kHz) and to measure or determine the wavelength of light reflected by the gratings in the FBG strain sensors 102, 103, 104.

In the illustrated embodiment, the system 100 also includes a memory device 152 and a processor 153 (coupled to the memory device 152) configured to calculate or determine the pressure differential across the wall of the pipe or tube P (or the absolute internal pressure inside the pipe or tube P). The memory device 152 and the processor 153 may be embodied in a computer (e.g., a desktop computer, a laptop computer, or a tablet computer). The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium. A processor may be fabricated on a single printed wiring board (PWB) or distributed over several interconnected PWBs. A processor may contain other processors; for example, a processor may include two processors, an FPGA and a CPU, interconnected on a PWB.

In one or more embodiments, computer-executable instructions (i.e., computer readable instructions) stored in the memory device 152, when executed by the processor 153, cause the processor 153 to calculate the pressure differential across the wall of the pipe or tube P (or the absolute internal pressure inside the pipe or tube P) based on the hoop strain measured by the hoop strain sensor 102, the axial strain measured by the axial strain sensor 103, the external pressure measured by the manometer 150, the outer diameter of the pipe or tube P measured by the calipers 148, the wall thickness of the pipe or tube P, the modulus of elasticity of the pipe or tube P, and the Poisson ratio of the pipe or tube P. In one or more embodiments, the instructions stored in the memory device 152, when executed by the processor 153, cause the processor 153 to calculate the internal pressure, $p_i$, of the pipe based on Equation 1 as follows:

$$p_i = -p_0 - 1.28 \frac{Er^2(r_o^2 - r_i^2)}{(1+\upsilon)r_i^2 r_o^2}\left(\frac{\Delta\lambda_B}{\lambda_B}\bigg|_h - \frac{\Delta\lambda_B}{\lambda_B}\bigg|_a\right) \quad \text{(Equation 1)}$$

where $p_o$ is the pressure outside of the pipe or tube P, E is the modulus of elasticity of the pipe or tube P, r is the radius of the pipe or tube P where the axial and hoop strain are measured, $r_o$ is the outer radius of the pipe or tube P, $r_i$ is the inner radius of the pipe or tube P, $\upsilon$ is the Poisson's ratio of the pipe or tube P, $(\Delta\lambda_B/\lambda_B|_h)$ is the ratio of the change in the wavelength reflected by the grating in the FBG hoop strain sensor 102 to the initial wavelength reflected by the grating in the FBG hoop strain sensor 102 (i.e., the change in the wavelength reflected by the FBG hoop strain sensor 102 between an initial state in which the interior of the pipe or tube is unpressurized, or pressurized at a known pressure, and a state in which the interior of the pipe or tube is arbitrarily pressurized), and $(\Delta\lambda_B/\lambda_B|_a)$ is the ratio of the change in the wavelength reflected by the grating in the FBG axial strain sensor 103 to the initial wavelength reflected by the grating in the FBG axial strain sensor 103.

In one or more embodiments, a constant R may be utilized to modify the hoop strain measured by the hoop strain sensor 102 and/or to modify the axial strain measured by the axial strain sensor 103 based on the thermal response of the FBG sensors 102, 103, the wavelength of the reference FBG sensor 104, the average coefficient of thermal expansion of the pipe or tube P, and the optical fiber coefficient of thermal expansion for the FBG sensors 102, 103. In one or more embodiments, the constant R may be in a range from approximately 1.2 to approximately 1.4. In one or more embodiments, the constant R may be calculated according to Equation 2 as follows:

$$R = 1 + \frac{\lambda_B^{ref}(\alpha_p - 0.78\alpha_f)}{1.28\gamma_f} \quad \text{(Equation 2)}$$

where $\lambda_B^{ref}$ is the wavelength of the reference FBG sensor 104, $\alpha_p$ is the average coefficient of thermal expansion of the pipe or tube P, $\alpha_f$ is the optical fiber coefficient of thermal expansion for the FBG sensors 102, 103, and $\gamma_f$ is the fiber thermal response of the FBG sensors 102, 103.

Figure 3:
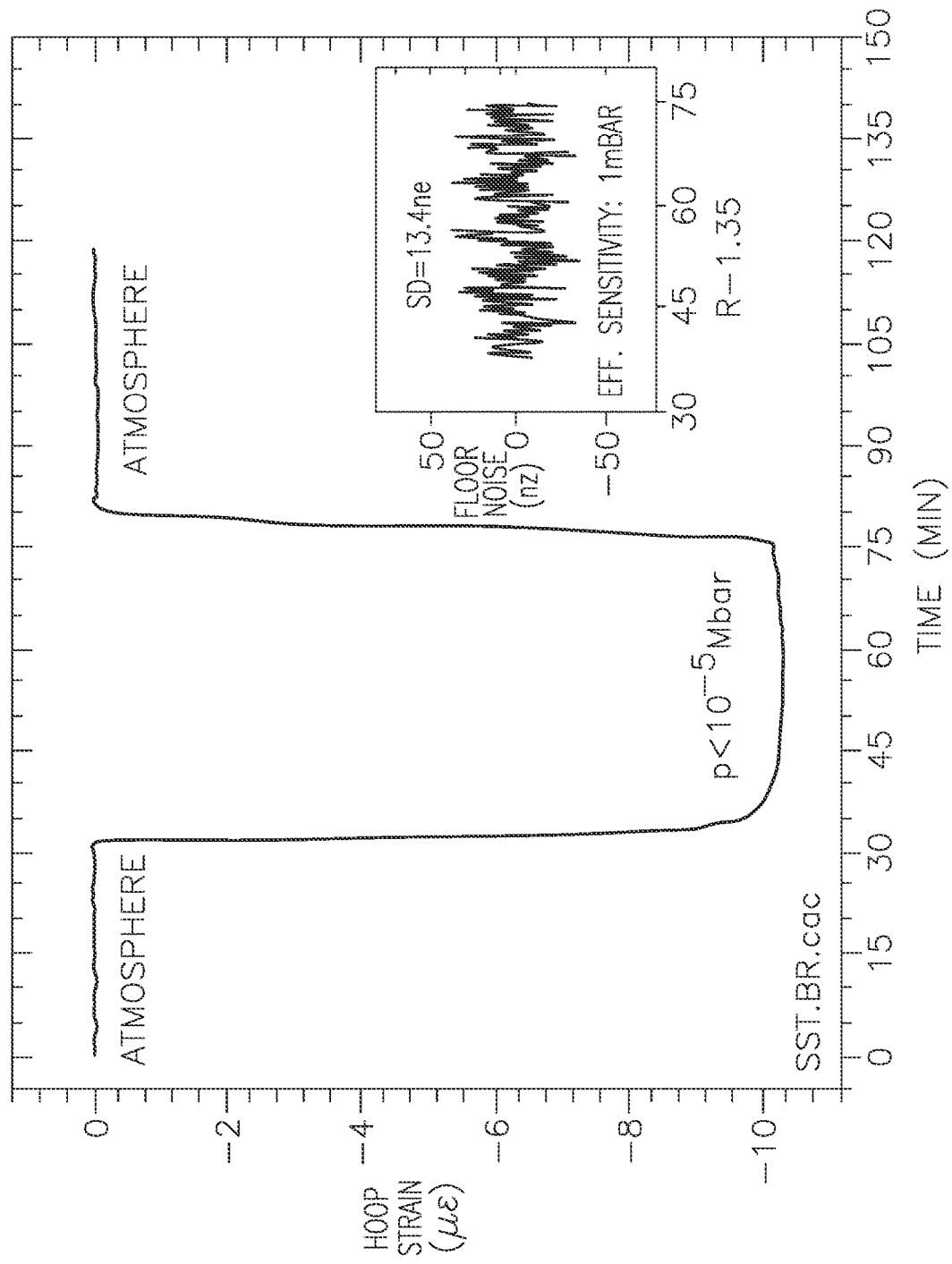
FIG. 3 is a graph depicting hoop strain of an outer surface of a stainless-steel pipe measured by a Fiber Bragg Grating (FBG) strain sensor and an interrogator according to one embodiment of the present disclosure in which the FBG strain sensor is directly secured to the outer surface of the pipe with cyanoacrylate adhesive.

FIG. 3 is a graph depicting the hoop strain on an outer surface of a pipe or tube P as measured by an FBG hoop strain sensor and the MO Hyperion si155 interrogator when the air was evacuated from inside the tube P. The hoop strain, $\epsilon_m$, on the outer surface of the pipe or tube P was calculated according to Equation 3 below where the constant R is used:

$$\epsilon_m = 1.28\left(\frac{\Delta\lambda_B}{\lambda_B} - R\frac{\Delta\lambda_B^{ref}}{\lambda_B^{ref}}\right). \quad \text{(Equation 3)}$$

Where $\Delta\lambda_B/\lambda_B$ is the ratio of the change in the wavelength reflected by the grating in the FBG sensor used to measure strain (e.g. hoop strain), $\Delta\lambda_B^{ref}/\lambda_B^{ref}$ is the ratio of the change in the wavelength reflected by the grating in the reference FBG sensor and R is the constant calculated according to Equation 2. Equation 3 provides the means to compensate the FBG strain measurements for thermal effects.

Setting the constant R to be 1.35, the thermally compensated hoop strain $\epsilon_m$ was calculated to be 10.2µε, which compares well with the estimate of 10.3µε computed for this type of stainless steel tube. FIG. 3 also depicts the computed standard deviation in the floor noise of 13.4 nε, which corresponds to an effective sensitivity of approximately 1 mBar.

Figure 4:
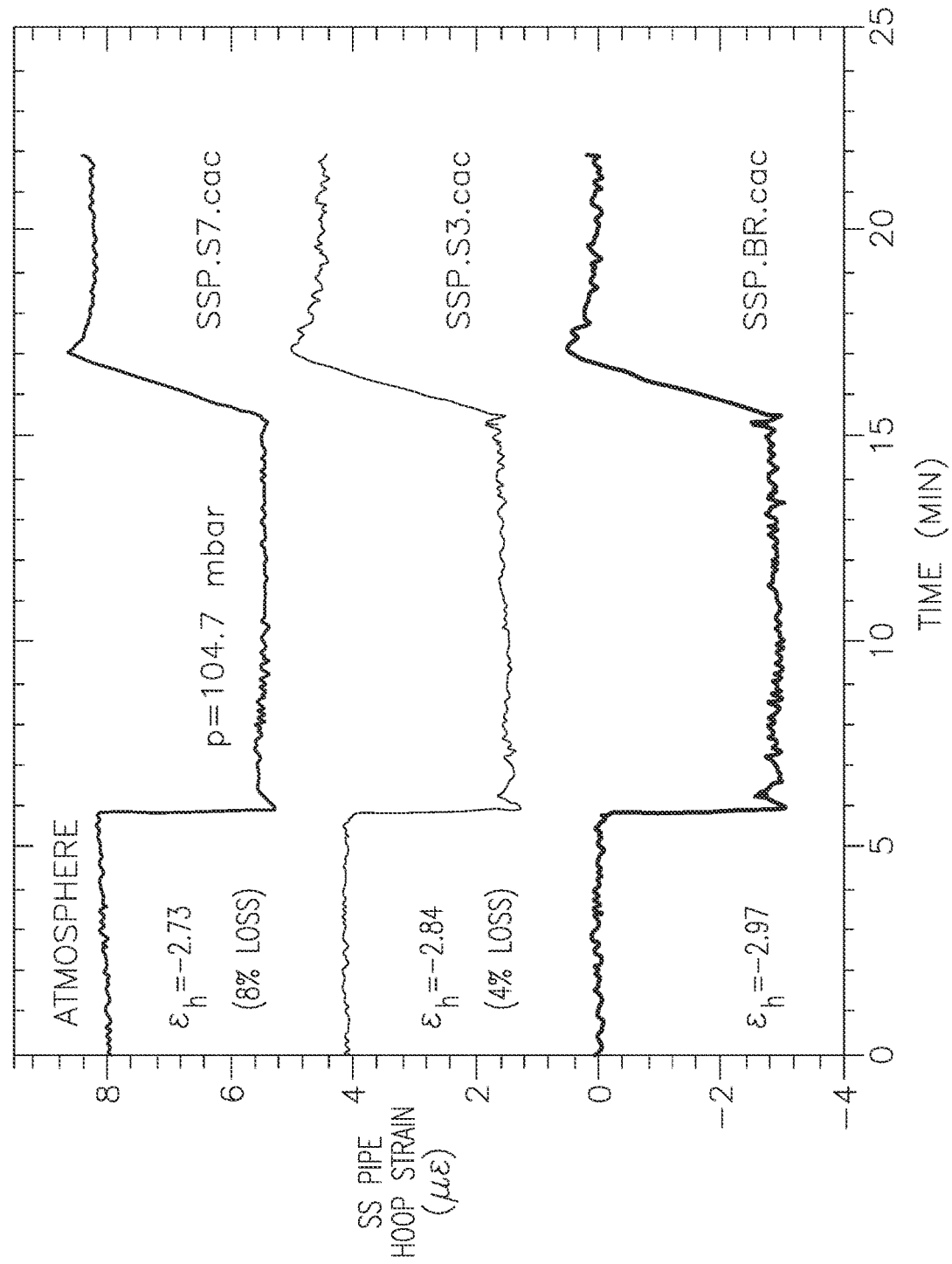
FIG. 4 is a graph depicting hoop strain ($\varepsilon_h$) of an outer surface of a stainless steel pipe measured by a Fiber Bragg Grating (FBG) strain sensor mounted to the pipe in three different ways, (i) the FBG strain sensor is secured directly to the outer surface of the pipe or tube with cyanoacrylate adhesive ("SSP.BR.cac"); (ii) the FBG strain sensor is secured to the pipe or tube with a band clamp having a thickness of 0.003 inch and the FBG strain sensor is attached to the band clamp with cyanoacrylate adhesive ("SSP.S3.cac"); and (iii) the FBG strain sensor is secured to the pipe or tube with a band clamp having a thickness of 0.007 inch and the FBG strain sensor is attached to the band clamp with cyanoacrylate adhesive ("SSP.S7.cac")

Four experiments were conducted to test the accuracy of the systems and methods of the present disclosure at noninvasively determining the internal pressure inside a pipe or tube, and to determine the sensitivity of the systems and methods of the present disclosure to small controlled changes in pipe pressure. At a constant mass flow rate of 15.12 standard liter per minute (slpm), the internal pressure of the pipe was changed in well-defined steps. For Experiment #1 the pressure was changed from atmospheric, down to 104.7 mbar, and then back again to atmospheric pressure. FIG. 4 shows results from Experiment #1, where the hoop strain ($\epsilon_h$) was measured with FBG strain sensors attached to an NPS 4 Schedule 40 stainless steel pipe having a length of 6 feet and a wall thickness of 0.237 inch in three different ways—(i) the FBG strain sensors mounted on a 0.003 inch thick stainless steel band ("SSP.S3.cac" in FIG. 4); (ii) the FBG strain sensors mounted on a 0.007 inch thick stainless steel band ("SSP.S7.cac" in FIG. 4); and (iii) the FBG strain sensor attached with cyanoacrylate adhesive directly on the bare outer surface of the stainless steel tube ("SSP.BR.cac" in FIG. 4). In FIG. 4, the curves for the three different ways in which the hoop strain ($\epsilon_h$) was measured are shifted vertically for clarity. FIG. 4 illustrates that strain lag is observable when stainless steel bands are used, and that the strain lag increases from 4% with the 0.003-inch-thick band to 8% with the 0.007-inch-thick band. The observed strain lag is not a problem, as long as the clamping method is properly characterized.

Figure 5A:
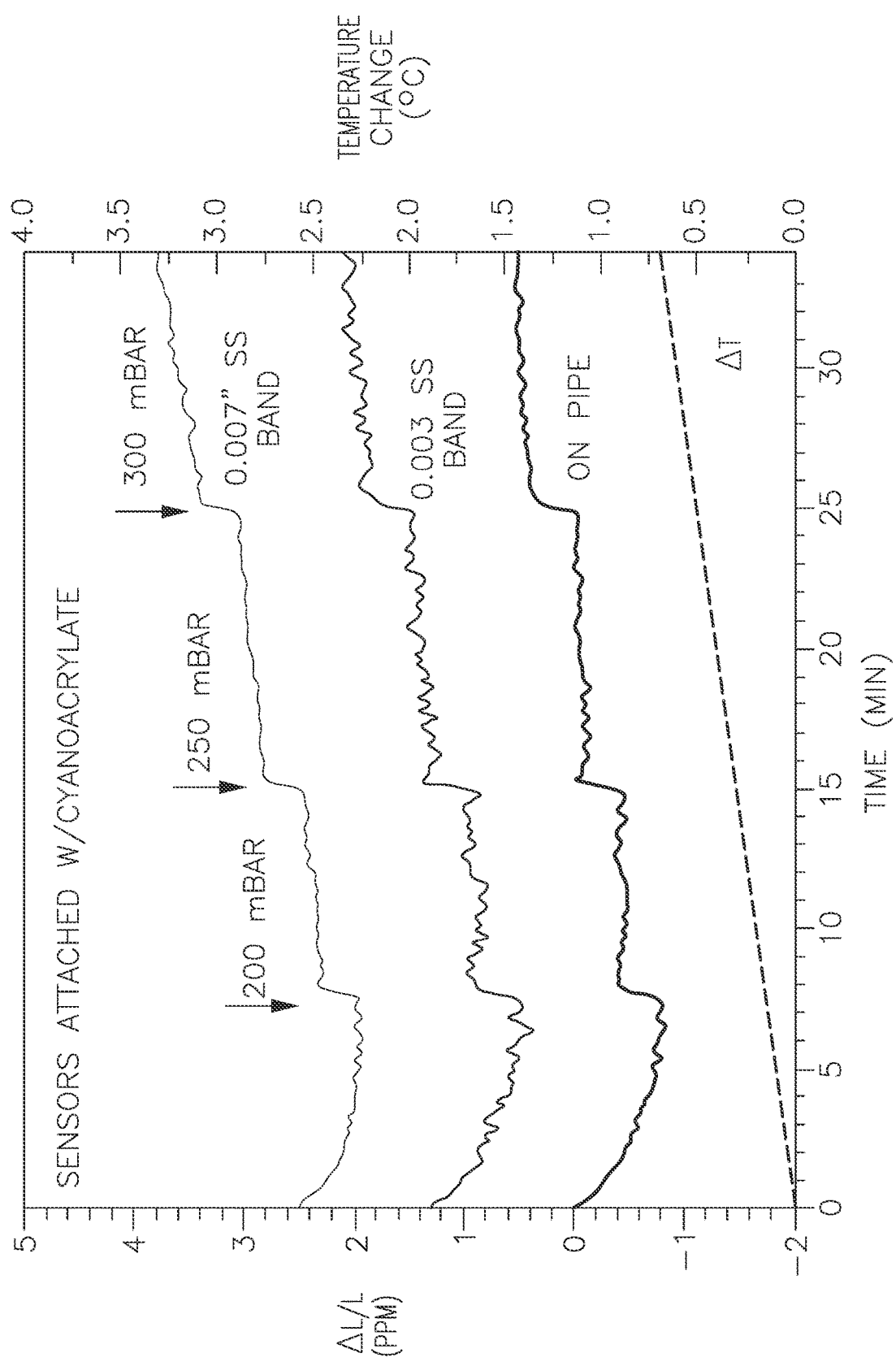
FIGS. 5a-5b are graphs depicting hoop strain of an outer surface of a stainless steel pipe measured by an FBG strain sensor attached with cyanoacrylate or Stycast® 2850 adhesive, respectively, and mounted to the pipe in three different ways, (i) the FBG strain sensor is secured directly to the outer surface of the pipe or tube with the adhesive ("on pipe"); (ii) the FBG strain sensor is secured to the pipe or tube with a band clamp having a thickness of 0.003 inch ("0.003 SS band"); and (iii) the FBG strain sensor is secured to the pipe or tube with a band clamp having a thickness of 0.007 inch ("0.007 SS band"). Room temperature increased about 0.7° C. over a 34-minute long test (FIG. 5a), and 0.2° C. over a 150-minute long test (FIG. 5b)
Figure 5B:
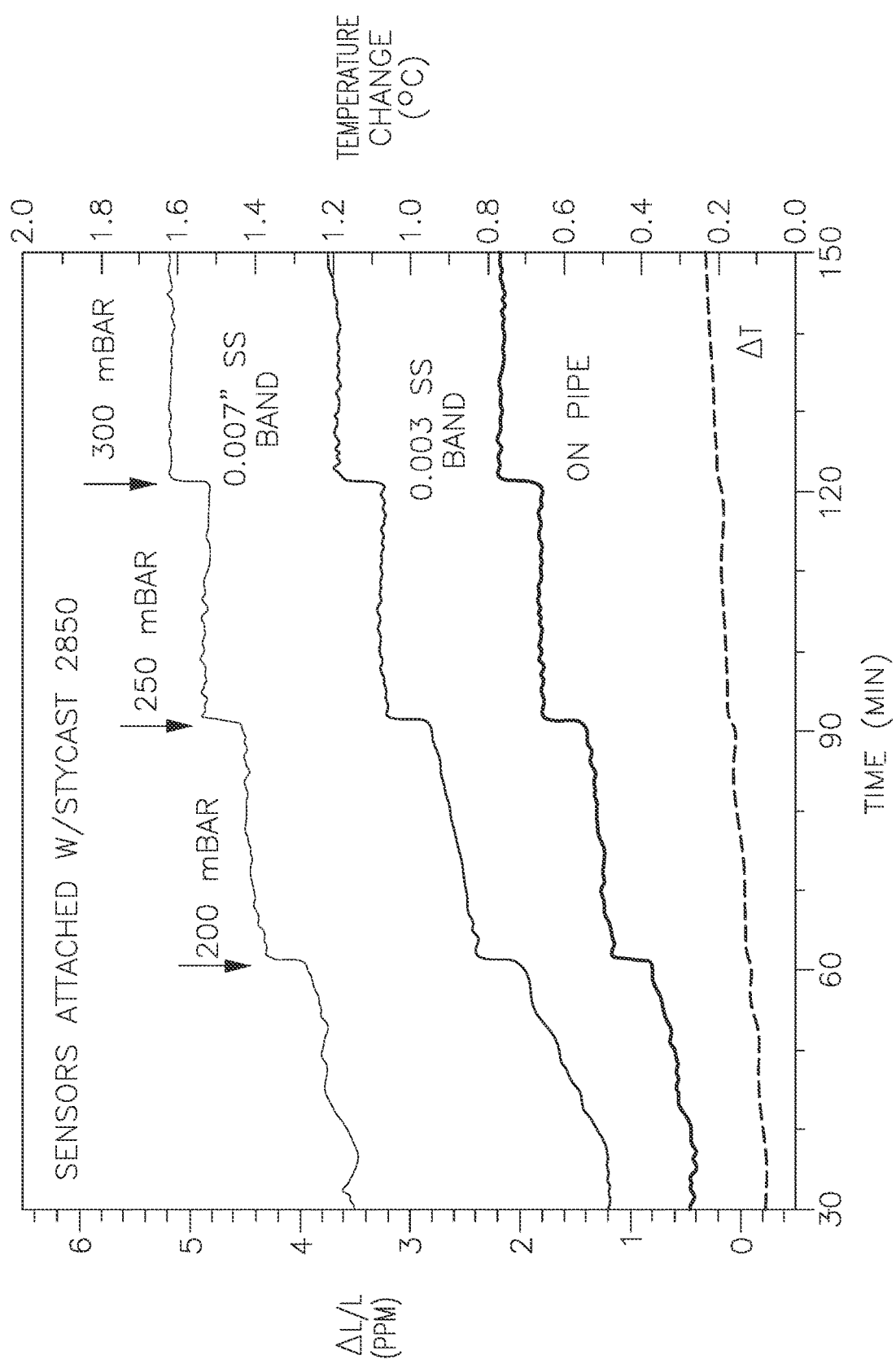

For Experiment #2, the tests began at 104.7 mbar as a baseline pressure, and the pressure was then increased in 50 mbar increments from 150 mbar until 400 mbar was achieved. FIGS. 5a-5b depict the results of Experiment #2 and depict hoop strain plotted as ΔL/L in units of parts-per-million vs time in minutes. In FIG. 5a, the FBG strain sensors were mounted directly on the surface of a stainless steel pipe ("SSP.BR.cac," thickest line in FIG. 5a), mounted to a stainless steel band having a thickness of 0.003 inch ("SSP.S3.cac," medium-thickness line in FIG. 5a), and mounted to a stainless steel band having a thickness of 0.007 inch ("SSP.S7.cac," thinnest line in FIG. 5a), and the FBG strain sensors were attached with cyanoacrylate adhesive. In FIG. 5b, the FBG strain sensors were mounted directly on the surface of a stainless steel pipe ("SSP.BR.sty," thickest line in FIG. 5b), mounted to a stainless steel band having a thickness of 0.003 inch ("SSP.S3.sty," medium-thickness line in FIG. 5b), and mounted to a stainless steel band having a thickness of 0.007 inch ("SSP.S7.sty", thinnest line in FIG. 5b), and the FBG strain sensors were attached with Stycast® 2850 adhesive. Comparing FIG. 5b to FIG. 5a evidences the improved signal-to-noise ratio from utilizing the Stycast® 2850 adhesive (i.e., the signal-to-noise ratio is improved utilizing Stycast® 2850 epoxy compared to cyanoacrylate adhesive). It is believed that the cyanoacrylate adhesive mechanically fatigues over the course of multiple compression/expansion cycles leading to unstable readings (i.e., greater noise).

The strains calculated for a bare 4-inch NPS SS 316 pipe (having a modulus of Elasticity E=193 GPa, Poisson ratio υ=0.25, a 4.5 inch outer diameter ($2 \cdot r_o$), and 0.237" wall thickness), using a nominal reference ambient pressure of 777.3 mbar are listed in Table 1 below. The difference between the strains associated to different pressure conditions (i.e. delta strain vs delta pressure) underestimate the experimental values. Due to the thicker pipe wall in stainless steel pipe (SSP) (when compared to stainless steel tube (SST)) the experiment standard deviation results in a pressure resolution of approximately 6 mbar.

TABLE 1

| Pressure inside the pipe [mbar] | Hoop strain $\varepsilon_h$ [με] | Delta Hoop strain [nε] | Experiment #1 [με] | Experiment #2 [nε] |
|---|---|---|---|---|
| 104.7 | −2.4470 | — | — | — |
| 150 | −2.2813 | $|\varepsilon_h(104.7) - \varepsilon_h(150)| = $ 165.7 | — | — |
| 200 | −2.0995 | $|\varepsilon_h(150) - \varepsilon_h(200)| = $ 181.8 | — | 245.5 |
| 250 | −1.9176 | $|\varepsilon_h(200) - \varepsilon_h(250)| = $ 181.8 | — | 235 |
| 300 | −1.7358 | $|\varepsilon_h(250) - \varepsilon_h(300)| = $ 181.8 | — | 225.9 |
| 350 | −1.5540 | 181.8 | — | — |
| 400 | −1.3721 | 181.8 | — | — |
| Atmosphere (777 mb) | 0 | $|\varepsilon_h(104.7) - \varepsilon_h(777)| = $ 2.447 | 2.77 | — |

In Experiments #3 and #4, three sets of FBG strain sensors were installed on a 4 inch diameter aluminum pipe. The three sets of sensors included FBG sensors mounted for hoop, axial, and no-strain (reference) and the three sets of sensors were mounted in four different ways—(i) directly on the bare pipe ("ALP.BR.sty"); (ii) on the aluminum H-clamp ("ALP.HC.sty"); and (iii) on the stainless steel band having a thickness of 0.003 inch ("ALP.S3.sty"); and (iv) on the stainless steel band having a thickness of 0.007 inch ("ALP.S7.sty"). The FBG strain sensors were all attached with Stycast® 2850 adhesive (sty), and sensors for reference/temperature were embedded in thermal grease and held in place with polyimide tape. In addition to the strain and reference FBG sensors, resistance temperature detector (RTD) sensors were also utilized, which were measured simultaneously during the pressure step protocols. Strain on all sets were measured simultaneously with the MO Hyperion® si155 interrogator and the FAZT® interrogator. Representative data sets for strain and temperature profiles obtained while varying the internal pressure of the pipe are displayed in FIG. 6 and FIG. 7.

Figure 6A:
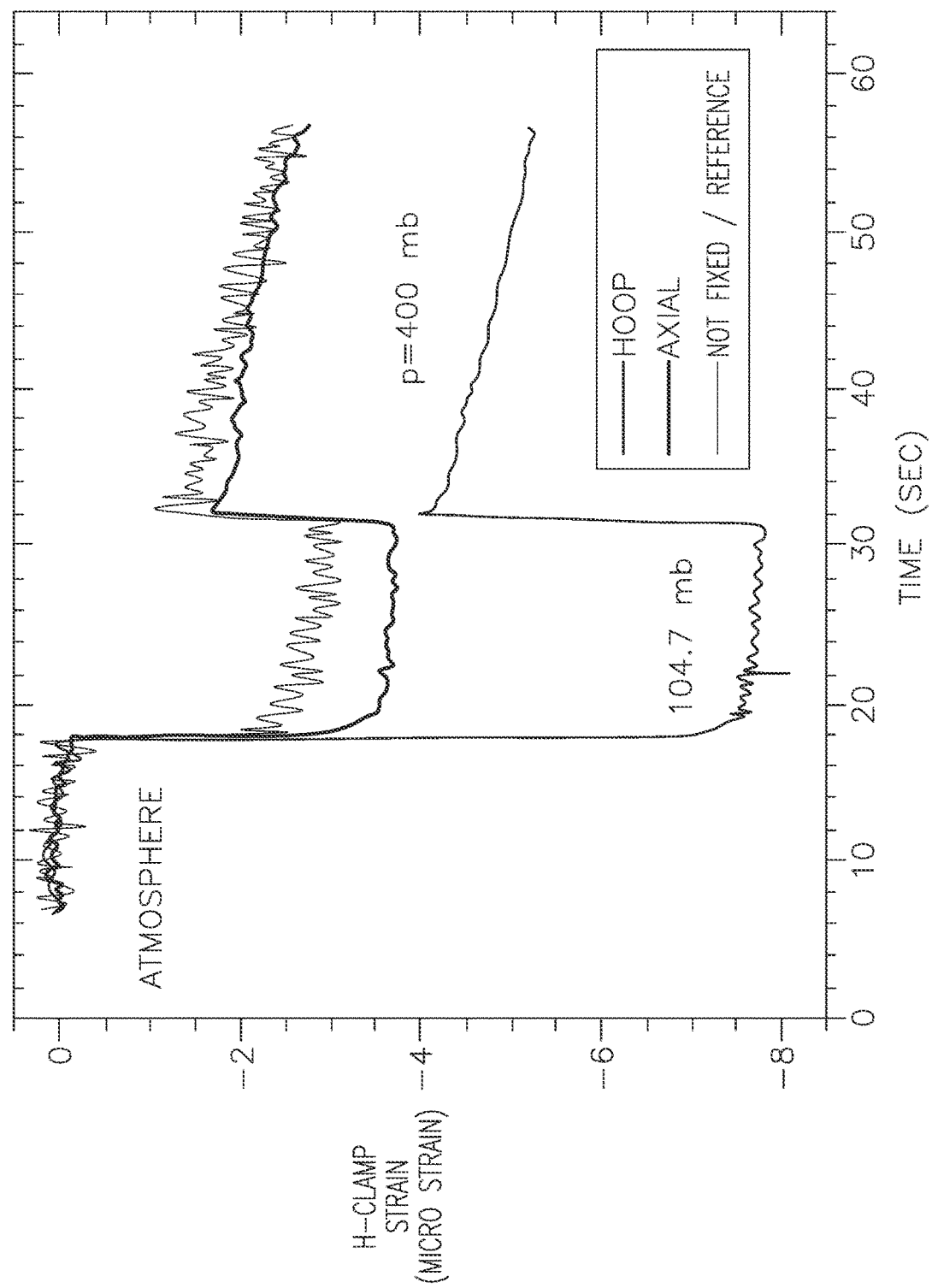
FIG. 6a is a graph depicting hoop strain, axial strain, and apparent strain in the reference sensor on the outer surface of an aluminum pipe. Hoop and axial strains are measured by FBG strain sensors attached with Stycast® 2850 epoxy and secured to the pipe or tube with the embodiment of the H-clamp illustrated in the lower portion of FIG. 1, and the apparent strain is measured by a reference sensor held in place by a thermal compound.
Figure 6B:
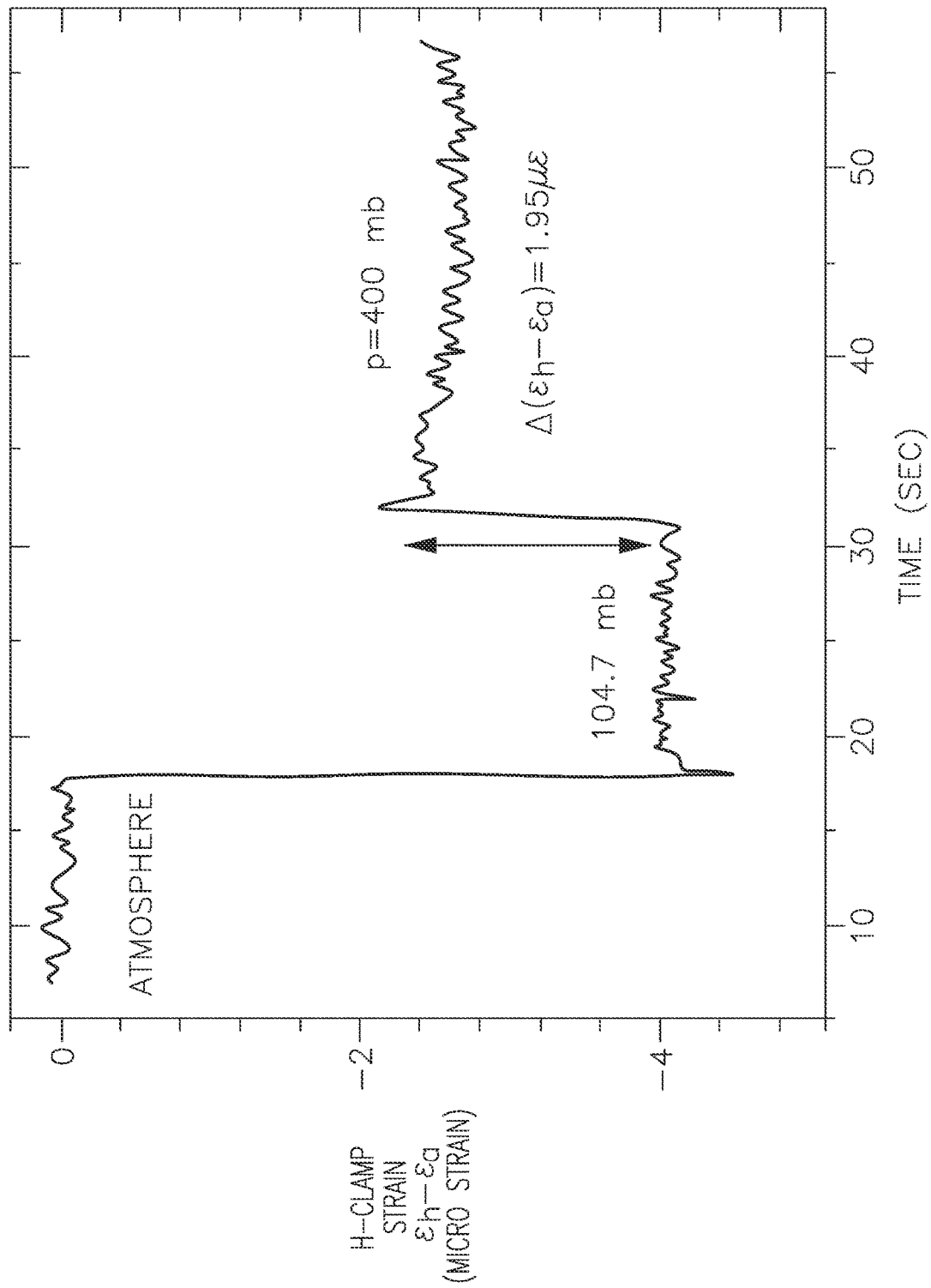
FIG. 6b depicts that the experimental difference between hoop strain and axial strain shown in FIG. 6a when the internal pipe pressure changes from 104.7 mb to 400 mb.

FIG. 6a (Experiment #3) depicts hoop strain $\varepsilon_h$, axial strain $\varepsilon_a$, and apparent strain of the aluminum pipe (ALP) as measured by FBG sensors fixed the aluminum H clamp (HC) with Stycast epoxy (sty) ("ALP.HC.sty"). The measurements were performed using a FAZT® interrogator. The magnitude of effect on the hoop strain is larger than on the axial strain, which in turn is larger than the unattached reference sensor that only responds to temperature changes inside the pipe when the pressure changes. FIG. 6b depicts that the experimental difference between hoop strain and axial strain ($\varepsilon_h - \varepsilon_a$) changes by (1.95±0.2) με when the internal pipe pressure changes from 104.7 mb to 400 mb. The computed delta strain in the same pressure range is 2.29με, which is in reasonable agreement with the experimental value of (1.95±0.2) με. While the calculations underestimate the experimental results for the stainless steel pipe (SSP), they overestimate the experimental results for aluminum pipe (ALP).

FIG. 7a (Experiment #4) depicts hoop strain $\varepsilon_h$, axial strain $\varepsilon_a$, and apparent strain measured by the reference sensor on the aluminum pipe (ALP) as measured by FBG sensors fixed directly to the bare aluminum pipe with Stycast 2850 adhesive (sty) ("ALP.BR.sty"). FIG. 7b depicts that the experimental difference between hoop strain and axial strain ($\varepsilon_h - \varepsilon_a$) computed from the data in FIG. 7a. The internal pressures applied to the pipe during this experiment are listed and onset marked with black triangles (e.g., a drop from 400 mbar to 350 mbar at 30 min; a drop from 350 mbar to 250 mbar at 60 min; and a drop from 250 mbar to 150 mbar at 90 min).

Values for the difference between hoop strain and axial strain ($\varepsilon_h - \varepsilon_a$) computed at the points where the internal pressure inside the pipe changes are listed in Table 2 below. The bare Aluminum 6061-T6 pipe used in this experiment has a modulus of Elasticity E=68.9 GPa, Poisson ratio υ=0.33, a 4.5 inch outer diameter ($2 \cdot r_o$), and 0.237" wall thickness. The values are presented in micro-strain (με) and nano-strain (nε).

TABLE 2

| Pressure inside the ALP [mbar] | Axial strain $\varepsilon_a$ [με] | Hoop strain $\varepsilon_h$ [με] | $\Delta(\varepsilon_h - \varepsilon_a)$ [με] | Delta differential strain [nε] | Experiment #4 [nε] |
|---|---|---|---|---|---|
| 104.7 | −1.3312E+00 | −6.5385E+00 | −5.2073E+00 | — | — |
| 150 | −1.2415E+00 | −6.0981E+00 | −4.8566E+00 | $|\Delta\varepsilon_h - \varepsilon_a(104.7) - \Delta\varepsilon_h - \varepsilon_a(150)| = 350.7$ | — |

TABLE 2-continued

| Pressure inside the ALP [mbar] | Axial strain $\varepsilon_a$ [µε] | Hoop strain $\varepsilon_h$ [µε] | $\Delta(\varepsilon_h - \varepsilon_a)$ [µε] | Delta differential strain [nε] | Experiment #4 [nε] |
|---|---|---|---|---|---|
| 200 | −1.1426E+00 | −5.6121E+00 | −4.4695E+00 | $\|\Delta\varepsilon_h - \varepsilon_a(150) - \Delta\varepsilon_h - \varepsilon_a(200)\| = 387.1$ | 336 ± 40 |
| 250 | −1.0436E+00 | −5.1260E+00 | −4.0824E+00 | $\|\Delta\varepsilon_h - \varepsilon_a(200) - \Delta\varepsilon_h - \varepsilon_a(250)\| = 387.1$ | 320 ± 40 |
| 300 | −9.4466E−01 | −4.6399E+00 | −3.6952E+00 | $\|\Delta\varepsilon_h - \varepsilon_a(250) - \Delta\varepsilon_h - \varepsilon_a(300)\| = 387.1$ | 317 ± 40 |
| 350 | −8.4570E−01 | −4.1538E+00 | −3.3081E+00 | $\|\Delta\varepsilon_h - \varepsilon_a(300) - \Delta\varepsilon_h - \varepsilon_a(350)\| = 387.1$ | 295 ± 40 |
| 400 | −7.4674E−01 | −3.6677E+00 | −2.9210E+00 | $\|\Delta\varepsilon_h - \varepsilon_a(400) - \Delta\varepsilon_h - \varepsilon_a(450)\| = 387.1$ | 341 ± 40 |

FIG. 8a depicts the hoop strain measured on the aluminum pipe (ALP) using three different attachment methods ((i) directly on the bare pipe ("ALP.BR.sty"); (ii) on the aluminum H-clamp ("ALP.HC.sty"); and (iii) on the stainless steel band having a thickness of 0.007 inch ("ALP.S7.sty")) to illustrate the effect of strain lag across clamp interfaces. As illustrated in FIG. 8(a), there is small yet finite strain lag when the FBG sensors are attached to bands and/or clamps.

Figure 8B:
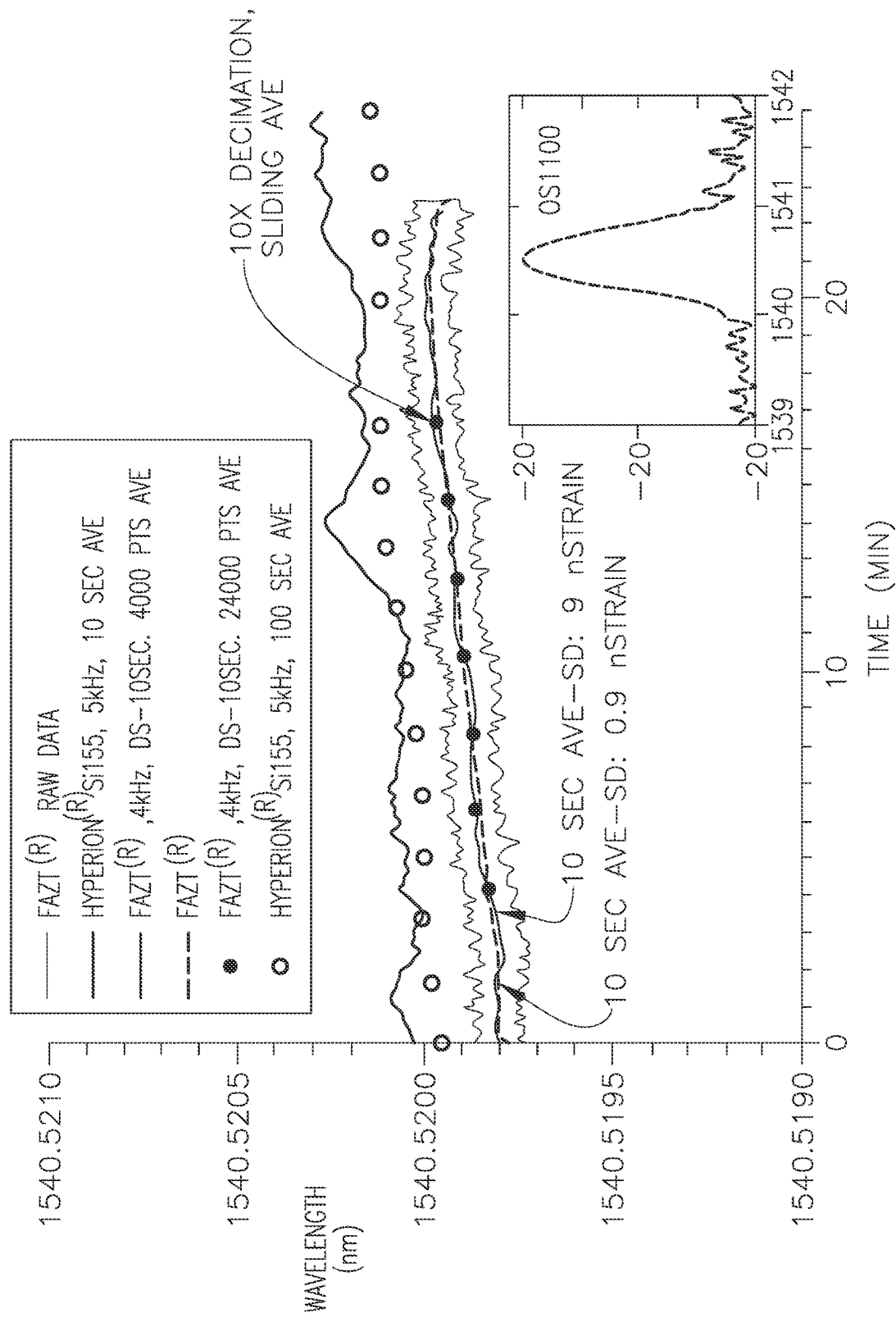
FIG. 8b is a graph comparing the performance of two different commercial interrogators utilized to determine the strain measurements, the MO Hyperion si155® interrogator and the FAZT I4® interrogator.

FIG. 8b shows a comparative run between the two commercial interrogators utilized in the above referenced experiments, the MO Hyperion si155® and the FAZT I4®. Superior stability and resolution are achieved with the FAZT I4® interrogator compared to the MO Hyperion si155® interrogator.

The present disclosure is also directed to various embodiments of a method for non-invasively measuring or determining the pressure inside a pipe or tube (or measuring to determining the pressure differential across the wall of the pipe or tube). FIG. 9 is a flowchart illustrating tasks of a method 200 of non-invasively determining the internal pressure inside a pipe or a tube according to one embodiment of the present disclosure.

In the embodiment illustrated in FIG. 9, the method 200 includes a task 210 of determining the hoop strain of the outer surface of the pipe or tube. The hoop strain is a function of the temperature of the pipe or tube and the internal pressure inside the pipe or tube. In one or more embodiments, the task 210 may be performed utilizing a hoop strain sensor attached to the outer surface of the pipe or tube. In one or more embodiments, the hoop strain sensor may be a Fiber Bragg Gratings (FBG) strain sensor or any other suitable type or kind of hoop strain sensor. Additionally, in one or more embodiments, the hoop FBG strain sensor may be attached to the pipe or tube with a clamp (e.g., the H-clamp described above) or by any other suitable mechanism or device.

In the illustrated embodiment, the method 200 also includes a task 220 of determining the axial strain of the outer surface of the pipe or tube. The axial strain is a function of the temperature of the pipe or tube and the internal pressure inside the pipe or tube. In one or more embodiments, the task 220 may be performed utilizing an axial strain sensor attached to the outer surface of the pipe or tube. In one or more embodiments, the axial strain sensor may be a Fiber Bragg Gratings (FBG) strain sensor or any other suitable type or kind of axial strain sensor. Additionally, in one or more embodiments, the axial FBG strain sensor may be attached to the pipe or tube with a clamp (e.g., the H-clamp described above) or by any other suitable mechanism or device.

In one or more embodiments, the method 200 may include a task 230 of pre-straining the axial strain sensor and/or pre-straining the hoop strain sensor before the task 220 of determining the axial strain of the outer surface of the pipe or tube and/or before the task 210 of determining the hoop strain of the outer surface of the pipe or tube. The task 230 of pre-straining the axial strain sensor and/or the hoop strain sensor is configured to ensure that the axial strain sensor and the hoop strain sensor remain taught such that any axial or circumferential elongation or contraction is due to a change in the internal pressure inside the pipe or tube. In one or more embodiments, the task 230 of pre-straining the hoop strain sensor may include tightening the fasteners securing the first clamp half to the second clamp half, as shown in FIG. 1. In one or more embodiments, the task 230 of pre-straining the axial strain sensor may include adjusting a tensioning mechanism on one of the clamp halves.

In the illustrated embodiment, the method 200 also includes a task 240 of individually compensating for temperature effects on the axial strain determined in task 210 and the hoop strain determined in task 220. In one or more embodiments, the task 240 may include utilizing a reference sensor, such as a resistance temperature detector (RTD) sensor (e.g., 156 in FIG. 2A), configured to measure or otherwise determine the temperature of the outer surface of the pipe or tube. In one or more embodiments, the task 240 may include measuring the temperature of the outer surface of the pipe or tube with an infrared thermometer. The task 240 also includes adjusting the hoop strain determined in task 210 and the axial strain determined in task 220 based on the temperature of the outer surface of the pipe or tube (e.g., reducing the axial strain and the hoop strain by the amount of temperature-induced apparent axial strain and hoop strain). In one or more embodiments in which the hoop and axial strain sensors are FBG sensors, the task 240 may include utilizing Equations 2 and 3 above.

In the illustrated embodiment, the method 200 also includes a task 250 of determining an external pressure external to the pipe or tube. In one or more embodiments, the task 250 of determining the external pressure may utilize a manometer or other suitable pressure measurement device.

In one or more embodiments, the method 200 also includes a task 260 of thermally insulating the hoop strain sensor and the axial strain sensor from the external environment. In one or more embodiments, the task 260 may include installing a thermal insulation (e.g., polyiso pipe insulation with Saran 560 sold by Amerisafe™) covering the hoop and axial strain sensors thereon.

The method 200 also includes a task 270 of determining the physical and mechanical properties of the pipe or tube. In one embodiment, the task 270 may include determining, with an ultrasound, the wall thickness of the pipe or tube, the modulus of elasticity of the pipe or tube, and/or the Poisson ratio of the pipe or tube. The task 270 may include determining, with an x-ray fluorescence device, a material of the pipe or tube (i.e., an alloy matching process or technique). The task 270 may include measuring, with a caliper, the outer diameter of the pipe or tube. In one or more embodiments, the physical and mechanical properties of the pipe or tube may be known a priori, or the physical and mechanical properties of the pipe or tube may be determined by inspecting physical marking on the pipe or tube placed by the manufacturer, and therefore in one or more embodiments the task 270 may not include measuring the physical and/or mechanical properties of the pipe or tube.

The method 200 also includes a task 280 of determining the internal pressure inside the pipe or tube based on the hoop strain determined in task 210, the axial strain determined in task 220, the external pressure determined in task 250, and the mechanical and physical properties of the pipe or tube determined in task 270 (e.g., the outer diameter of the pipe or tube, the wall thickness of the pipe or tube, the modulus of elasticity of the pipe or tube, and the Poisson ratio of the pipe or tube). This task 280 of determining the internal pressure inside the pipe or tube may include utilizing Equation 1 above. In this manner, the method 200 is configured to non-invasively (i.e., without modification to the pipe or tube and without access to the interior of the pipe or tube) measure or determine the internal pressure of the pipe or tube.

In one or more embodiments, one ring piezoelectric actuator 154 and one ring piezoelectric sensor 155 are stacked on top of each other on each of the openings 114, 115, 116, 117 in the flanges 110, 111, 112, 113. When fasteners 118, 119, 120, 121 are installed to secure the first clamp half 105 to the second clamp half 106, each fastener puts in compression the ring piezoelectric actuator 154 stacked on top of the ring piezoelectric sensor 155. The ring piezoelectric actuators 154 and the ring piezoelectric sensors 155 are configured to apply, measure, and control the force applied on flanges 110, 111, 112, 113 to secure the first clamp half 105 to the second clamp half 106. This configuration enables the determination of the absolute pressure inside the pipe P by applying method 200 twice over a given interval of time T. For instance, in one or more embodiments, the hoop and axial strains are measured with strain sensors 102 and 103 during a first time with the ring piezoelectric actuators 154 at rest (i.e., no additional force is applied to secure the first clamp half 105 to the second clamp half 106 other than the force exerted by fasteners 118, 119, 120, 121). The hoop and axial strains measured during the first time are equal to: $e\_h1=e\_h@(p\_o-p\_i, e\_h)$ and $e\_a1=e\_a@(p\_o-p\_i, e\_a)$ where $e\_h@(p\_o-p\_i, e\_h)$ and $e\_a@(p\_o-p\_i, e\_a)$ are the hoop and axial strains measured under the pressure differential $(p\_o-p\_i)$ including strains $e\_h$ and $e\_a$ associated to the unknown pressure of the pipe P at the time the clamp 101 is installed on the pipe P. Additionally, in one or more embodiments, the hoop and axial strains are measured a second time with the ring piezoelectric actuators 154 applying a force f on the clamp 101. The hoop and axial strains measured during the second time are equal to: $e\_h2=e\_h@(p\_o+p\_actuator-p\_i, e\_h)$ and $e\_a2=e\_a@(p\_o+p\_actuator-p\_i, e\_a)$ where $e\_h@(p\_o+p\_actuator-p\_i, e\_h)$ and $e\_a@(p\_o+p\_actuator-p\_i, e\_a)$ are the hoop and axial strains measured under the pressure differential $(p\_o-p\_i)$ with the addition of the pressure p_actuator generated by the actuators. By assuming that the pressure inside the pipe is constant over the interval of time T and by subtracting $e\_h2-e\_h1$ and $e\_a2-e\_a1$, the strains $e\_h$ and $e\_a$ associated to the unknown pressure of the pipe P at the time the clamp 101 is installed on the pipe P are determined. The knowledge of strains $e\_h$ and $e\_a$ enables the determination of the absolute pressure inside the pipe P. The ability to reduce the interval of time T (as much it is allowed by the bandwidth of the sensing and actuating system) permits the assumption that the pressure is constant inside the pipe P while $e\_h$ and $e\_a$ are determined. For instance, if T is reduced to a few seconds or less, the pressure inside the pipe P can be assumed to be constant without losing accuracy.

In the event that the pressure inside the pipe is constant over long intervals of times (e.g., several hours), $e\_h$ and $e\_a$ can be determined by just leveraging the normally occurring fluctuation in the atmospheric pressure. Specifically, $e\_h1$, $e\_h2$, $e\_a1$ and $e\_a2$ will be calculated for different atmospheric pressure values $p\_o1$ and $p\_o2$ over the day: $e\_h1=e\_h@(p\_o1-p\_i, e\_h)$, $e\_a1=e\_a@(p\_o1-p\_i, e\_a)$, $e\_h2=e\_h@(p\_o2-p\_i, e\_h)$, $e\_a2=e\_a@(p\_o2-p\_i, e\_a)$.

As described above, method 200 has been implemented by leveraging one axial and one hoop strain measurement. Formula 1 used in method 200 is based on the analytical solution of the stress and strain distribution in a pipe subjected to a pressure differential. Stress and strain distribution can be determined in a more general way using finite-element analysis (FEA) models for arbitrary geometry and for arbitrarily applied loads. FEA models enable solving the stress/strain problems for any point on the outer surface of the pipe and create a relationship (i.e., solve an inverse problem) between the stress/strain distribution and a pre-defined set of loads and boundary conditions applied to the geometry. For this reason, by leveraging FEA models and inverse solutions, method 200 can be extended to the use of more than two strain measurements taken along arbitrary directions.

Digital twins represent a virtual replica of a physical system. Examples of digital twins are reduced order models that are capable of providing solutions as accurate as those of an FEA model but at a reduced computational cost. Digital twins can be fed with data collected with sensors (i.e., strain measurements) and used to predict the behavior of the physical system. Accordingly, in one or more embodiments, method 200 can be extended to the use of digital twins for real time estimates of the pressure differential across the wall of a physical system and the absolute pressure inside it based on strain measurements collected on the outer surface of the physical system (e.g., a pipe or tube, or more complex geometries).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" to another component, it can be directly attached to the other component or intervening components may be present therebetween.

What is claimed is:

1. A method of non-invasively determining an internal pressure inside an object, the method comprising:
   determining, with a hoop strain sensor on an outer surface of the object, hoop strain of the outer surface of the object;
   determining, with an axial strain sensor on the outer surface of the object, axial strain of the outer surface of the object;
   determining, with a manometer, an external pressure external to the object;
   determining the internal pressure inside the object based on the hoop strain, the axial strain, the external pressure, an outer dimension of the object, a wall thickness of the object, a modulus of elasticity of the object, and a Poisson ratio of the object; and
   compensating for temperature effects on the hoop strain and the axial strain, comprising:
      determining, utilizing a reference strain sensor thermally coupled to the object with a non-hardening thermal compound, an apparent strain of the object caused by temperature changes; and
      adjusting the axial strain and the hoop strain based on the apparent strain by reducing the axial strain by an amount of temperature-induced apparent axial strain and reducing the hoop strain by an amount of temperature-induced apparent hoop strain.

2. The method of claim 1, wherein the reference strain sensor is a reference Fiber Bragg Grating (FBG) sensor.

3. The method of claim 2, wherein the hoop strain sensor is a first Fiber Bragg Grating (FBG) strain sensor, and wherein the axial strain sensor is a second Fiber Bragg Grating strain sensor.

4. The method of claim 3, wherein the determining the internal pressure of the object comprises determining the internal pressure, $p_i$, based on Equation 1:

$$p_i = p_o - 1.28 \frac{Er^2(r_o^2 - r_i^2)}{(1+\upsilon)r_i^2 r_o^2}\left(\frac{\Delta\lambda_B}{\lambda_B}\bigg|_h - \frac{\Delta\lambda_B}{\lambda_B}\bigg|_a\right) \quad \text{(Equation 1)}$$

wherein $p_o$ is the external pressure, r is a radius of the pipe or tube where the axial and hoop strain are measured, E is the modulus of elasticity of the pipe or tube, $r_o$ is an outer radius of the pipe or tube, $r_i$ is an inner radius of the pipe or tube, $\upsilon$ is the Poisson's ratio, $(\Delta\lambda_B/\lambda_B|_h)$ is a ratio of a change in a wavelength reflected by a grating in the first FBG strain sensor to an initial wavelength reflected by the grating in the first FBG strain sensor, and $(\Delta\lambda_B/\lambda_B|_a)$ is a ratio of a change in a wavelength reflected by a grating in the second FBG strain sensor to an initial wavelength reflected by the grating in the second FBG strain sensor.

5. The method of claim 4, wherein the compensating for the temperature effects comprises calculating a thermally compensated strain, $\epsilon_m$, according to Equation 3:

$$\epsilon_m = 1.28\left(\frac{\Delta\lambda_B}{\lambda_B} - R\frac{\Delta\lambda_B^{ref}}{\lambda_B^{ref}}\right) \quad \text{(Equation 3)}$$

where $\Delta\lambda_B/\lambda_B$ is the ratio of the change in the wavelength reflected by the grating in one of the first and second FBG strain sensors, $\Delta\lambda_B^{ref}/\lambda_B^{ref}$ is the ratio of the change in the wavelength reflected by a grating in the reference FBG sensor, and R is a constant calculated according to Equation 2:

$$R = 1 + \frac{\lambda_B^{ref}(\alpha_p - 0.78\alpha_f)}{1.28\gamma_f} \quad \text{(Equation 2)}$$

where $\lambda_B^{ref}$ is the wavelength of the reference FBG sensor, $\alpha_p$ is an average coefficient of thermal expansion of the pipe or tube, $\alpha_f$ is an optical fiber coefficient of thermal expansion for the one of the first and second FBG strain sensors, and $\gamma_f$ is a fiber thermal response of the one of the first and second FBG strain sensors.

6. The method of claim 1, wherein the method is performed utilizing a finite-element analysis model of the object.

7. The method of claim 6, wherein the finite-element analysis model is a digital twin of the object.

8. The method of claim 1, wherein the compensating for the temperature effects comprises:
   determining a temperature of the outer surface of the object; and
   adjusting the axial strain and the hoop strain based on the temperature.

9. The method of claim 8, wherein the determining the temperature comprises determining the temperature utilizing a utilizing a resistance temperature detector (RTD) device.

10. The method of claim 1, further comprising thermally insulating the hoop strain sensor and the axial strain sensor with insulation.

11. The method of claim 10, wherein the insulation comprises polyiso pipe insulation.

12. The method of claim 1, wherein the object is a pipe or a tube.

13. The method of claim 1, further comprising determining, with an ultrasound device, the wall thickness of the object.

14. The method of claim 1, further comprising determining, with an ultrasound device, the modulus of elasticity and the Poisson ratio of the object.

15. The method of claim 1, further comprising determining, with an x-ray fluorescence device, a material of the object.

16. The method of claim 1, further comprising measuring, with a caliper, the outer dimension of the object.

17. The method of claim 1, further comprising pre-straining at least one of the axial strain sensor and the hoop strain sensor.

18. The method of claim 1, further comprising pre-straining both the axial strain sensor and the hoop strain sensor.

* * * * *